US008605600B2

(12) United States Patent
Takeda et al.

(10) Patent No.: US 8,605,600 B2
(45) Date of Patent: Dec. 10, 2013

(54) WIRELESS COMMUNICATION SYSTEM, ACCESS POINT, CONTROLLER, NETWORK MANAGEMENT DEVICE, AND METHOD OF SETTING NETWORK IDENTIFIER OF ACCESS POINT

(75) Inventors: Ken Takeda, Tokyo (JP); Makito Saitou, Tokyo (JP); Toshiyuki Yoshida, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 815 days.

(21) Appl. No.: 12/461,857

(22) Filed: Aug. 26, 2009

(65) Prior Publication Data

US 2010/0074236 A1    Mar. 25, 2010

(30) Foreign Application Priority Data

Sep. 22, 2008 (JP) .................................. 2008-242278
Jun. 3, 2009 (JP) .................................. 2009-133810

(51) Int. Cl.
*G01R 31/08* (2006.01)
(52) U.S. Cl.
USPC ........................................................ 370/242
(58) Field of Classification Search
USPC .......................... 370/221, 225, 242, 328, 338
See application file for complete search history.

(56) References Cited

U.S. PATENT DOCUMENTS

| | | | | |
|---|---|---|---|---|
| 7,020,707 | B2 * | 3/2006 | Sternagle | 709/230 |
| 2004/0248557 | A1 * | 12/2004 | Muratsu | 455/411 |
| 2005/0135236 | A1 * | 6/2005 | Benson et al. | 370/225 |
| 2006/0074918 | A1 * | 4/2006 | Nakatsuka et al. | 707/10 |
| 2007/0147318 | A1 * | 6/2007 | Ross et al. | 370/338 |
| 2008/0313274 | A1 * | 12/2008 | Murray et al. | 709/203 |

FOREIGN PATENT DOCUMENTS

| | | |
|---|---|---|
| JP | 2000049858 A | 2/2000 |
| JP | 2005073256 A | 3/2005 |
| JP | 2006-311077 A | 11/2006 |

OTHER PUBLICATIONS

Japanese Office Action dated Mar. 22, 2013, issued in corresponding Japanese Patent Application, Japan Application No. 2009-133810.

* cited by examiner

*Primary Examiner* — Mark Rinehart
*Assistant Examiner* — Peter Cheng
(74) *Attorney, Agent, or Firm* — Rabin & Berdo, P.C.

(57) ABSTRACT

There is provided a wireless communication system including: a wireless terminal that communicates information; an access point that performs wireless communication with the wireless terminal; a main server that communicates with the access point through a network and manages line connection of the wireless terminal; and a survival server that communicates with the access point through the network and manages the line connection of the wireless terminal in place of the main server, wherein the access point detects a communication state between the main server and the access point and between the survival server and the access point, and sets a network identifier of the access point according to the communication state, and wherein the wireless terminal performs wireless communication with the access point using the network identifier, and communicates information with the main server or the survival server according to the network identifier.

44 Claims, 23 Drawing Sheets

FIG. 3A

STORAGE UNIT OF AP 4

| PROFILE NAME 1 | SSID 1 | IP ADDRESS 1 OF MAIN SERVER 1 | | MONITORING TARGET FLAG ON |
|---|---|---|---|---|
| PROFILE NAME 2 | SSID 2 | IP ADDRESS 2 OF SURVIVAL SERVER 2 | | MONITORING TARGET FLAG OFF |
| PROFILE NAME 3 | SSID 3 | IP ADDRESS 3 OF SURVIVAL SERVER 3 | | MONITORING TARGET FLAG OFF |

FIG. 3B

STORAGE UNIT OF AP 5

| PROFILE NAME 1 | SSID 1 | IP ADDRESS 1 OF MAIN SERVER 1 | | MONITORING TARGET FLAG ON |
|---|---|---|---|---|
| PROFILE NAME 2 | SSID 2 | IP ADDRESS 2 OF SURVIVAL SERVER 2 | ACTIVE | MONITORING TARGET FLAG ON |
| PROFILE NAME 3 | SSID 3 | IP ADDRESS 3 OF SURVIVAL SERVER 3 | | MONITORING TARGET FLAG OFF |

FIG. 3C

STORAGE UNIT OF AP 6

| PROFILE NAME 1 | SSID 1 | IP ADDRESS 1 OF MAIN SERVER 1 | | MONITORING TARGET FLAG ON |
|---|---|---|---|---|
| PROFILE NAME 2 | SSID 2 | IP ADDRESS 2 OF SURVIVAL SERVER 2 | | MONITORING TARGET FLAG OFF |
| PROFILE NAME 3 | SSID 3 | IP ADDRESS 3 OF SURVIVAL SERVER 3 | PASSIVE | MONITORING TARGET FLAG ON |

FIG. 4

PROFILE INFORMATION OF TERMINAL

| PROFILE NAME 1 | SSID 1 | IP ADDRESS 1 OF MAIN SERVER 1 |
|---|---|---|
| PROFILE NAME 2 | SSID 2 | IP ADDRESS 2 OF SURVIVAL SERVER 2 |
| PROFILE NAME 3 | SSID 3 | IP ADDRESS 3 OF SURVIVAL SERVER 3 |

FIG. 9

THRESHOLD VALUE OF LOAD STORED IN STORAGE UNIT OF AP 4

| | | | |
|---|---|---|---|
| IP ADDRESS 1 OF MAIN SERVER 1 | CPU USE RATIO 70% OR MORE | MEMORY USE RATIO 70% OR MORE | NW RESOURCE USE RATIO 85% OR MORE |
| IP ADDRESS 2 OF SURVIVAL SERVER 2 | CPU USE RATIO 90% OR MORE | | |
| IP ADDRESS 3 OF SURVIVAL SERVER 3 | CPU USE RATIO 90% OR MORE | MEMORY USE RATIO 85% OR MORE | |

FIG. 22

STORAGE UNIT OF CONTROLLER 11

| PROFILE NAME 1 | SSID 1 | IP ADDRESS 1 OF MAIN SERVER 1 | | MONITORING TARGET FLAG ON | |
|---|---|---|---|---|---|
| PROFILE NAME 2 | SSID 2 | IP ADDRESS 2 OF SURVIVAL SERVER 2 | ACTIVE | MONITORING TARGET FLAG ON | SETTING INFORMATION OF ACCESS CONTROL FOR TRAFFIC FLOWING IN FROM BACKBONE |
| PROFILE NAME 3 | SSID 3 | IP ADDRESS 3 OF SURVIVAL SERVER 3 | | MONITORING TARGET FLAG OFF | SETTING INFORMATION OF TRAFFIC CONTROL FOR TRAFFIC FLOWING IN FROM BACKBONE |

FIG. 23

STORAGE UNIT OF AP 5

| | | | |
|---|---|---|---|
| PROFILE NAME 1 | SSID 1 | IP ADDRESS 1 OF MAIN SERVER 1 | MONITORING TARGET FLAG ON |
| PROFILE NAME 2 | SSID 2 | IP ADDRESS 2 OF SURVIVAL SERVER 2 | PASSIVE | MONITORING TARGET FLAG ON |
| | SSID 3 | IP ADDRESS 2 OF SURVIVAL SERVER 2 | PASSIVE | |
| PROFILE NAME 3 | SSID 4 | IP ADDRESS 3 OF SURVIVAL SERVER 3 | | MONITORING TARGET FLAG OFF |

FIG. 24

PROFILE OF STORAGE UNIT

| PROFILE NAME 1 | SSID 1 | IP ADDRESS 1 OF MAIN SERVER 1 | | | MONITORING TARGET FLAG ON |
|---|---|---|---|---|---|
| PROFILE NAME 2 | SSID 2 | IP ADDRESS 2 OF SURVIVAL SERVER 2 | ACTIVE | AES PSK | MONITORING TARGET FLAG ON |
| PROFILE NAME 3 | SSID 3 | IP ADDRESS 3 OF SURVIVAL SERVER 3 | | | MONITORING TARGET FLAG OFF |

WIRELESS COMMUNICATION SYSTEM, ACCESS POINT, CONTROLLER, NETWORK MANAGEMENT DEVICE, AND METHOD OF SETTING NETWORK IDENTIFIER OF ACCESS POINT

CROSS-REFERENCE TO RELATED APPLICATION

This application is based on and claims priority under 35 USC 119 from Japanese Patent Application Nos. 2008-242278 filed on Sep. 22, 2008 and 2009-133810 filed on Jun. 3, 2009, the disclosures of which are incorporated by reference herein.

BACKGROUND

1. Technical Field

The present invention relates to a wireless communication system, an access point, a controller, a network management device, and a method of setting network identifiers of an access point.

2. Related Art

In the related art, a wireless LAN terminal is disclosed where, for example, "Information such as Profile Name, SSID (Service Set Identifier), IP (Internet Protocol) Address Set, DNS (Domain Name System) Set, Proxy Set, Communication Channel Set, Security Method Set (e.g., WEP (Wired Equivalent Privacy)), and SIP Server Set is stored for each profile. A wireless LAN terminal 100 performs a scanning operation which involves scanning and searching access points 200, 200a, 200b, and 200c of connection lines according to the profile, and performs a wireless connection with the responding access points". An example of the related art is JP-A 2006-311077.

Conventionally, it is known that a server (survival surface) which is an alternative to a main server is installed at each base, the management of wireless terminals is switched from the main server to the survival server when a failure occurs in the main server, and information communication continues in the base.

However, in a wireless terminal (wireless LAN terminal) which does not cope with the switching of the servers using the same network identifier (ESSID: Extended Service Set Identifier; hereinafter, also referred to as "SSID"), for example, when the switching of the servers from the main server to the survival server is performed due to a communication failure or the like, registration (information communication) to the survival server cannot be performed, and accordingly, service becomes unavailable as communication using the survival server cannot be performed.

In the state where the registration to the survival server cannot be performed, network traffic occurs since the wireless terminal repeats the registration to the main server. This problem becomes more pronounced as the number of terminals increases.

In the technique described in JP-A 2006-311077, an SSID and an SIP server to be used are determined by a profile. Alternatively, a profile and an SIP server to be used are determined by an SSID.

However, in a wireless communication system where plural access points are set in the same SSID, a wireless terminal that does not cope with the switching of the servers using the same SSID, cannot be switched to a server (SIP server) to be used.

Therefore, there is a demand for a wireless communication system, an access point, a controller, a network management device, and a method of setting a network identifier of an access point, which are capable of performing the switching of servers even when a wireless terminal does not cope with the switching of servers using the same network identifier.

SUMMARY

The present invention provides a wireless communication system according to the invention including:

a wireless terminal that communicates information;

an access point that performs wireless communication with the wireless terminal;

a main server that communicates with the access point through a network and manages line connection of the wireless terminal; and a survival server that communicates with the access point through the network and manages the line connection of the wireless terminal in place of the main server, wherein the access point detects a communication state between the main server and the access point and between the survival server and the access point, and sets a network identifier of the access point according to the communication state, and wherein the wireless terminal performs wireless communication with the access point using the network identifier, and communicates information with the main server or the survival server according to the network identifier.

The present invention provides an access point, which connects to and perform wireless communication with a wireless terminal, and communicates through a network with a first device performing a process associated with line connection of the wireless terminal and a second device performing the process associated with the line connection of the wireless terminal in place of the first device, wherein the access point detects a communication state between the first device and the access point and between the second device and the access point, sets a network identifier of the access point according to the communication state, performs wireless communication with the wireless terminal using the network identifier, and allows the wireless terminal to communicate information with the first device or the second device according to the network identifier.

The present invention provides a controller, which connects to an access point that connects to and performs wireless communication with a wireless terminal, and which is connected through a network with to a first device performing a process associated with line connection of the wireless terminal and a second device performing the process associated with the line connection of the wireless terminal in place of the first device, wherein the controller detects a communication state between the first device and the controller and between the second device and the controller, sets a network identifier of the access point according to the communication state, allows the access point to have wireless communication with the wireless terminal using the network identifier, and allows the wireless terminal to communicate information with the first device or the second device according to the network identifier.

The present invention provides a network management device, which is connected through a network to an access point that connects to and perform wireless communication with a wireless terminal, and which is connected through the network to a first device performing a process associated with line connection of the wireless terminal and a second device performing the process associated with the line connection of the wireless terminal in place of the first device, wherein the network management device detects a communication state between the first device and the network management device and between the second device and the network management device, sets a network identifier of the access point according to the communication state, allows the access point to have wireless communication with the wireless terminal using the network identifier, and allows the wireless terminal to communicate information with the first device or the second device according to the network identifier.

The present invention provides a method of setting a network identifier of an access point relaying communication and interposed between a first network and a second network, the method including:

detecting a communication state between a first device disposed in the second network and performing a process associated with line connection of a wireless terminal in the first network and the access point;

detecting a communication state between a second device disposed in the second network and performing the process associated with the line connection of the wireless terminal in place of the first device and the access point;

extracting a network identifier of the access point allowing the wireless terminal to communicate information with the first device or the second device according to the detected communication state; and setting the extracted network identifier for the access point.

In the invention, the access point detects a communication state between the main server and the access point and between the survival server and the access point, and sets a network identifier of the access point according to the communication state. The wireless terminal communicates information with the main server or the survival server according to the network identifier. Accordingly, it is possible to perform the switching of servers, even when a wireless terminal does not cope with the switching of servers using the same network identifier.

It should be noted that term of "connection" used in the specification is not limited to a physical connection. Rather, it is a concept including a wireless connection.

BRIEF DESCRIPTION OF THE DRAWINGS

Exemplary embodiments of the present invention will be described in detail based on the following figures, wherein:

FIGS. 3A to 3C are diagrams illustrating profile data stored in a storage unit of AP;

FIG. 4 is a diagram illustrating profile data stored in a wireless terminal;

FIG. 9 is a diagram illustrating a threshold value of load stored in a storage unit of AP;

FIG. 22 is a diagram illustrating profile data stored in a storage unit of a controller according to Embodiment 6;

FIG. 23 is a diagram illustrating profile data stored in a storage unit of AP according to Embodiment 7; and FIG. 24 is a diagram illustrating profile data stored in a storage unit according to Embodiment 8.

DETAILED DESCRIPTION

Embodiment 1

Figure 1:
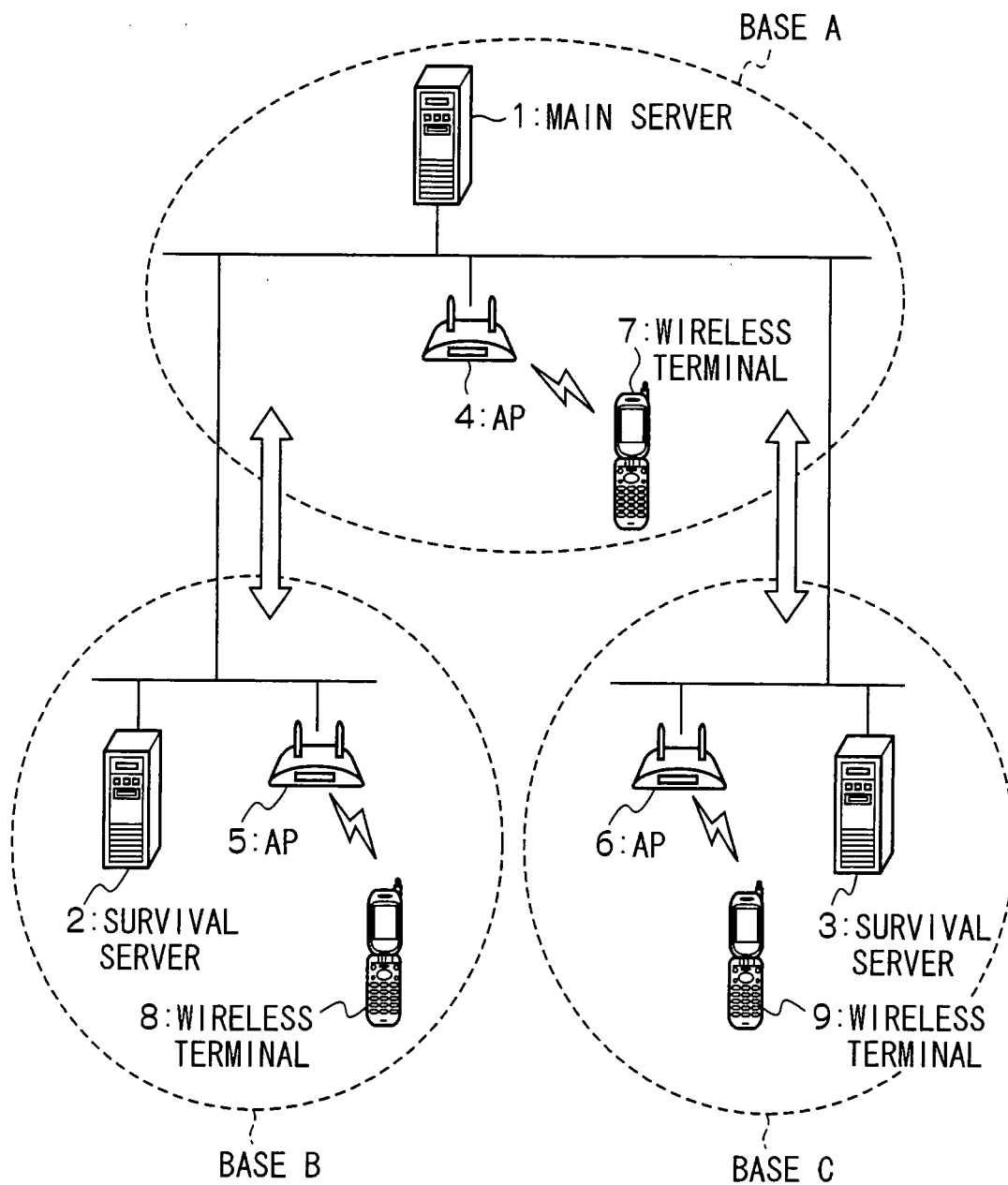
FIG. 1 is a diagram illustrating a configuration of a wireless IP phone system according to Embodiment 1.

FIG. 1 is a diagram illustrating a configuration of a wireless IP phone system according to Embodiment 1. In the embodiment, a case where a wireless communication system according to the invention is applied to a wireless IP (Internet Protocol) phone system will be described.

In FIG. 1, the wireless IP phone system according to Embodiment 1 includes a main server 1, a survival server 2, a survival server 3, an access point (hereinafter, also referred to as "AP") 4, an AP 5, an AP 6, a wireless terminal 7, a wireless terminal 8, and a wireless terminal 9.

The main server 1, the survival server 2, the survival server 3, AP 4, AP 5, and AP 6 are connected to one another by a wire LAN and can communicate with one another. The wireless terminal 7, the wireless terminal 8, and the wireless terminal 9 (hereinafter, simply, "terminal" in the case of no distinction) are respectively connected to the AP 4, AP 5, and AP 6 (hereinafter, simply, "access point" or "AP" in the case of no distinction) by a wireless LAN, and can communicate information by wireless. The AP 4, the AP 5, and the AP 6 relay communication between the wire LAN and the wireless LAN.

The wireless IP phone system shown in FIG. 1 is provided with a base A, a base B, and a base C. The base A includes the main server 1, the AP 4, and the wireless terminal 7. The base B includes the survival server 2, the AP 5, and the wireless terminal 8. The base C includes the survival server 3, the AP 6, and the wireless terminal 9.

For example, when a phone system is configured in one district or region, a base indicates a range included in the phone system. For example, the base A may be the Tokyo district, the base B may be the Osaka district, and the base C may be the Nagoya district.

In FIG. 1, the bases A to C as bases are shown as examples, but the invention is not limited thereto. Plural bases having the same functions may be provided. In addition, the number of terminals and access points installed in each base are not particularly limited, and plural terminals and access points may be provided.

The main server 1, the survival server 2, and the survival server 3 (hereinafter, referred to as "SERVER" in the case of no distinction) are call processing devices connectable to an IP network. For example, the servers are formed of an SIP server or IP-PBX having an IP interface. The main server 1 is a primarily installed call processing device. The survival server 2 and the survival server 3 are secondarily installed call processing devices. The survival servers 2 and 3 operate in place of the main server 1 by an operation to be described later, when a failure occurs in the main server 1. IP addresses different from one another are set in the call processing devices, and the call processing devices are installed in each base.

In addition, "MAIN SERVER 1" corresponds to "FIRST DEVICE" in the invention. In addition, "SURVIVAL SERVER 2" and "SURVIVAL SERVER 3" correspond to "SECOND DEVICE" in the invention.

The AP 4, the AP 5, and the AP 6 are base stations for allowing terminals to be connected to the wireless LAN. The AP 4, the AP 5, and the AP 6 having a wire LAN interface and a wireless LAN interface are connected to each LAN, and transmit communication between the wire LAN and the wireless LAN. The AP 4, the AP 5 and the AP 6 detect the communication state between the server and the access point, and set SSID as network identifiers of the access points according to the communication state.

In addition, "WIRELESS LAN" corresponds to "FIRST NETWORK" in the invention. In addition, "WIRE LAN" corresponds to "SECOND NETWORK" in the invention.

In the AP 4, the AP 5, and the AP 6, previously, the SSID is set to be the same, and is installed at each base. In Embodiment 1, it is assumed that, "SSID 1" is normally preset as the SSID of the AP 4 to the AP 6.

Figure 2:
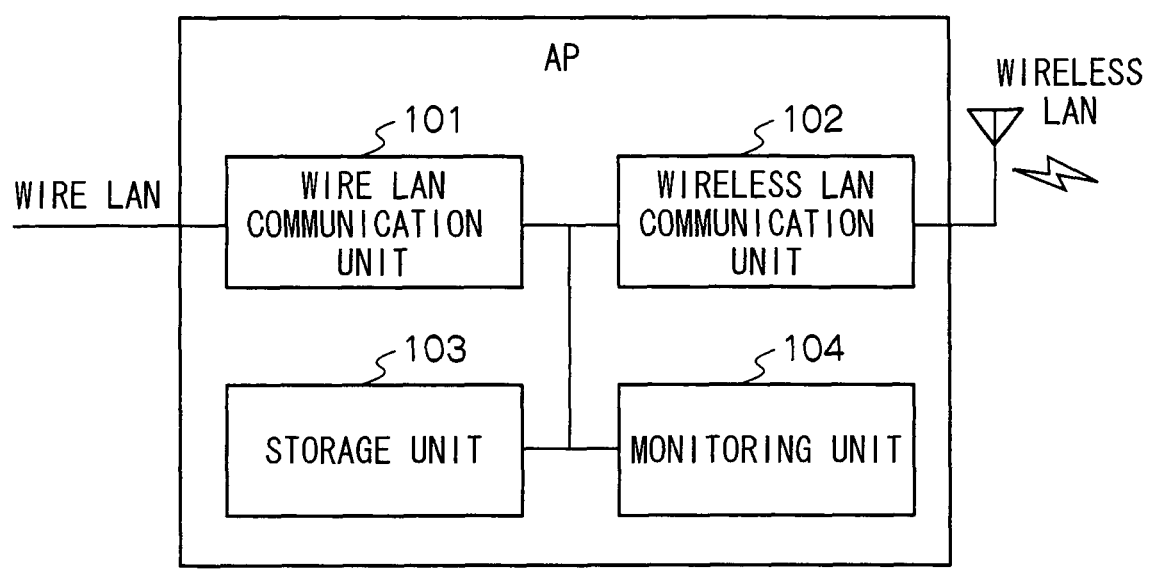
FIG. 2 is a diagram illustrating a configuration of an access point according to Embodiment 1.

FIG. 2 is a diagram illustrating a configuration of the access point according to Embodiment 1. As shown in FIG. 2, the access point includes a wire LAN communication unit 101, a wireless LAN communication unit 102, a storage unit 103, and a monitoring unit 104.

The wire LAN communication unit 101 is connected to the wire LAN. The wireless LAN communication unit 102 is connected to the wireless LAN. The wire LAN communication unit 101 and the wireless LAN communication unit 102 are connected to each other and can relay communication. In the storage unit 103, plural profiles are stored. The monitoring unit 104 monitors a server on the basis of the profiles stored in the storage unit 103. Next, a configuration of profile data stored in the storage unit 103 will be described with reference to FIGS. 3A to 3C.

FIGS. 3A to 3C are diagrams illustrating profile data stored in the storage unit of the AP. FIG. 3A shows the profiles stored in the storage unit 103 of the AP 4. FIG. 3B shows the profiles stored in the storage unit 103 of the AP 5. FIG. 3C shows the profiles stored in the storage unit 103 of the AP 6.

As shown in FIGS. 3A to 3C, the profiles stored in the storage unit 103 are different for each AP. Each profile includes a profile name, an SSID, an IP address of a monitoring target server, a corresponding scanning method, and a monitoring target flag.

As shown in FIG. 3A, FIG. 3B, and FIG. 3C, in the profiles stored in the storage unit 103 for each AP, the monitoring target flag of the profile including the IP address of the main server 1 is set to "ON". In addition, when the survival server 2 or the survival server 3 is installed in the base where the access point is installed, the monitoring target flag of the profile including the IP address of the survival server is set to "ON".

That is, the AP 4 and the main server 1 are installed in the base A, and thus "IP ADDRESS 1 OF MAIN SERVER 1" is preset to "MONITORING TARGET FLAG ON" in the storage unit 103 of the AP 4 as shown in FIG. 3A. In addition, the AP 5 and the survival server 2 are installed in the base B, and thus "IP ADDRESS 1 OF MAIN SERVER 1" and "IP ADDRESS 2 OF SURVIVAL SERVER 2" are preset to "MONITORING TARGET FLAG ON" in the storage unit 103 of the AP 5 as shown in FIG. 3B. In addition, the AP 6 and the survival server 3 are installed in the base C, and thus "IP ADDRESS 1 OF MAIN SERVER 1" and "IP ADDRESS 3 OF SURVIVAL SERVER 3" are preset to "MONITORING TARGET FLAG ON" in the storage unit 103 of the AP 6 as shown in FIG. 3C.

The monitoring unit 104 of the AP 4 to the AP 6 monitors the main server 1 and the survival servers 2 and 3 set to "MONITORING TARGET FLAG ON", on the basis of the monitoring target flag of the profile stored in the storage unit 103 of the access point.

That is, in the storage unit 103 of the AP 4, as shown in FIG. 3A, "IP ADDRESS 1 OF MAIN SERVER 1" is set to "MONITORING TARGET FLAG ON", and thus the monitoring unit 104 of the AP 4 performs the monitoring on the basis of "IP ADDRESS 1 OF MAIN SERVER 1". That is, in the storage unit 103 of the AP 5, as shown in FIG. 3B, "IP ADDRESS 1 OF MAIN SERVER 1" and "IP ADDRESS 2 OF SURVIVAL SERVER 2" are set to "MONITORING TARGET FLAG ON", and thus the monitoring unit 104 of AP 5 performs the monitoring on the basis of "IP ADDRESS 1 OF MAIN SERVER 1" and "IP ADDRESS 2 OF SURVIVAL SERVER 2". That is, in the storage unit 103 of the AP 6, as shown in FIG. 3C, "IP ADDRESS 1 OF MAIN SERVER 1" and "IP ADDRESS 3 OF SURVIVAL SERVER 3" are set to "MONITORING TARGET FLAG ON", and thus the monitoring unit 104 of AP 6 performs the monitoring on the basis of "IP ADDRESS 1 OF MAIN SERVER 1" and "IP ADDRESS 3 OF SURVIVAL SERVER 3".

The monitoring unit 104 monitors (detects) the communication state between the server and the access point. As a means for monitoring the communication state, for example, the monitoring unit requests connection by at least one out of a ICMP (Internet Control Message Protocol) ping using a message type based on RFC (Request for Comments) 792 or a SIP protocol using an SIP message based on RFC 3261, and obtains a connection response from the server, thereby detecting the communication state. That is, when the monitoring unit 104 requests a connection and can obtain the connection response from the server, the monitoring unit 104 recognizes that the connection has succeeded and that the communication between the server and the access point is normal. In addition, when the monitoring unit 104 requests a connection and cannot obtain the connection response from the server, the monitoring unit 104 recognizes that the connection has failed and that there is a communication failure between the server and the access point. The monitoring unit 104 has a protocol stack to realize the connection request by the ICMP ping and the SIP message, and creates and transmits the connection request through the protocol stack. When the monitoring unit 104 obtains a connection response, the monitoring unit 104 receives the connection response through the protocol stack, thereby analyzing the connection response. By expanding the protocol stack, it is possible to transmit a connection request by the expanded ICMP ping and the expanded SIP message and to receive the connection response.

Hereinafter, a connection request using the SIP message will be described. Specifically, a connection request using the SIP message is to use a message of REGISTER or INVITE. In the case of performing a connection request using the SIP message, it is set in advance in the monitoring unit 104 whether either one of REGISTER or INVITE is used for the connection request, the transmission period of the SIP message is set (e.g., 1 second to 3600 seconds), and SIP URI (Uniform Resource Identifier) (Phone Number) is set. In addition, it may be set such that both REGISTER and INVITE are used for the connection request. In this case, REGISTER and INVITE are alternately transmitted during the set period. For example, REGISTER is transmitted, and then INVITE is transmitted.

The SIP URI set to the monitoring unit 104 is a SIP URI that is available (registrable) in the main server 1, the survival server 2, and the survival server 3. The SIP URI is mainly used to detect the communication state. The SIP URI is set differently for each AP.

First, a connection request in the case of using the message of REGISTER will be described. REGISTER is a message for associating the SIP URI with a device using SIP URI and registering them in an SIP server and for making a phone service available by using the SIP URI. The monitoring unit 104 transmits (requests connection) REGISTER, including a SIP URI set to the monitoring unit 104, to a monitoring target server. The monitoring target server receiving REGISTER performs a registration process on the basis of REGISTER. When the registration succeeds, the monitoring target server transmits (responds to connection) a response signal of 200 OK of the SIP message. If the monitoring unit 104 receives 200 OK, the first monitoring is completed as a connection response has been obtained. Then, in the same manner, the monitoring unit 104 periodically transmits REGISTER according to the transmission period of the message set to the monitoring unit 104. As described above, the monitoring unit 104 requests a connection using the message of REGISTER, and obtains a connection response. Accordingly, it is possible to detect the communication state.

Next, a connection request in the case of using the message of INVITE will be described. INVITE is a call request message in a phone service. The monitoring unit 104 transmits SIP URI set for the AP and including a header field of TO and FROM of INVITE, to the monitoring target server. That is, INVITE is calling to the AP. The monitoring target server receiving INVITE performs a calling process on the basis of INVITE, and transmits (connection response) 486 BUSY HERE since TO and FROM are the same. If the monitoring unit 104 receives 486 BUSY HERE, the first monitoring is completed as a connection response has been obtained. At this time, the monitoring unit 104 transmits ACK, reports the reception of 486 BUSY HERE, and normally completes the transmitted INVITE. Then, similarly, the monitoring unit 104 periodically transmits INVITE according to the transmission period of the message set for the AP. As described above, the monitoring unit 104 requests a connection using the message of INVITE, and obtains a connection response. Accordingly, it is possible to detect the communication state.

Hereinafter, the case will be described where the monitoring unit 104 detects the communication state using an ICMP ping which uses the message type based on, for example, RFC 792.

When the connection to the server fails and the monitoring unit 104 recognizes that a failure has occurred, the monitoring unit 104 of the AP 4 to the AP 6 sets the monitoring target flag to ON, the SSID of the profile including server which has a successful connection, and the corresponding scanning method in the profiles stored in the storage unit 103, in the wireless LAN communication unit 102.

That is, for example, the monitoring unit 104 of the AP 5 monitors "IP ADDRESS 1 OF MAIN SERVER 1" and "IP ADDRESS 2 OF SURVIVAL SERVER 2" on the basis of the settings of the storage unit 103 shown in FIG. 3B. For example, in a state where connection confirmation of the main server 1 fails and connection confirmation of the survival server 2 succeeds, the monitoring unit 104 sets SSID as "SSID 2" and the corresponding scanning method as "ACTIVE", in the wireless LAN communication unit 102 on the basis of "PROFILE NAME 2". In addition, when there is no profile scanning method stored, the scanning method is not set in the wireless LAN communication unit 102.

In the wireless LAN, the AP is searched (scanned) by the terminal for connection between the AP installed in a service area and the terminal, and the AP capable of communicating is acquired. In this case, an active scanning method or a passive scanning method is used as the searching method.

The active scanning involves the terminal transmitting a connection request signal (Probe Request), the AP transmitting a connection response signal (Probe Response) including SSID set to the AP with respect to the received connection request signal (Probe Request), and the terminal performing a connection process on the AP having the same SSID as that of the terminal when the terminal receives the connection response signal (Probe Response) from the AP.

The passive scanning involves the terminal monitoring a control signal (beacon) regularly transmitted by the AP, and performing a connection process to the AP when SSID included in the control signal (beacon) is the same as SSID set in the terminal.

Generally, in normal scanning, first, the AP is searched for by performing the active scanning, and the passive scanning is performed by switching the active scanning to the passive scanning when an AP cannot be acquired. Then, when an AP cannot be picked out, the active scanning and the passive scanning are alternately repeated.

In Embodiment 1, the wireless LAN communication unit 102 of each AP transmits a message of a disconnection signal (Deauthentication) to the wireless LAN when SSID and the corresponding scanning method are set from the monitoring unit 104. In addition, the wireless LAN communication unit 102 performs a recursion process by connecting to the wireless LAN on the basis of the setting information. When the scanning method has not been set, this case corresponds to the above-described normal scanning.

That is, for example, in the AP 5, in a state where connection confirmation of the main server 1 fails and connection confirmation of the survival server 2 succeeds, SSID is set to "SSID 2" in the wireless LAN communication unit 102 of the AP 5 on the basis of "PROFILE NAME 2", and the corresponding scanning method is set to "ACTIVE". At this time, the wireless LAN communication unit 102 of the AP 5 transmits the disconnection signal message (Deauthentication) to the wireless LAN and performs the recursion process. When the connection request signal (Probe Request) is received from the terminal, the wireless LAN communication unit 102 transmits the connection response signal (Probe Response) including "SSID 2" set for the wireless LAN communication unit 102.

In addition, for example, in the AP 6, in a state where connection confirmation of the main server 1 fails and connection confirmation of the survival server 3 succeeds, SSID is set to "SSID 3" in the wireless LAN communication unit 102 of the AP 6 on the basis of "PROFILE NAME 3" and the corresponding scanning method is set to "PASSIVE". At this time, the wireless LAN communication unit 102 of the AP 6 transmits the disconnection signal message (Deauthentication) to the wireless LAN and performs the recursion process. The wireless LAN communication unit 102 transmits the control signal (beacon) including SSID set for the wireless LAN communication unit 102.

In FIG. 1, the wireless terminal 7, the wireless terminal 8, and the wireless terminal 9 are wireless IP phone terminals. The wireless terminals 7 to 9 have a wireless LAN interface, are connected to the wireless LAN and communicate information by wireless. The wireless terminals 7 to 9 can perform phone calling and receiving of processes. The terminals perform wireless communicate with the access points using the same SSID as the SSID set for the access points. In addition, the terminals communicate information with the main server 1, the survival server 2, or the survival server 3 according to the set SSID.

The wireless terminals 7 to 9 may be phone terminals such as mobile phones, and may be soft phones in which an IP phone application is installed in a PC.

FIG. 4 is a diagram illustrating profile data stored in the wireless terminal. As shown in FIG. 4, plural profiles is set in advance in each terminal. Each profile includes a profile name, an SSID, an address of an access point server. In the embodiment, it is assumed that "SSID 1" is normally set as the SSID of each terminal.

"IP ADDRESS 1 OF MAIN SERVER 1", "IP ADDRESS 2 OF SURVIVAL SERVER 2", and "IP ADDRESS 3 OF SURVIVAL SERVER 3" correspond to the identification information on the main server or the survival server in the invention.

The detailed configurations of the devices constituting the wireless IP phone system have been described above. Next, the normal operation of the wireless IP phone system will be described.

In FIG. 1, a case of phone communication between the wireless terminal 8 and the wireless terminal 9 will be described. Normally, "SSID 1" is set for both the wireless terminal 8 and the AP 5. The wireless terminal 8 performs a connection process to the AP 5 by the above-described normal scanning method. When the wireless terminal 8 is calling to the wireless terminal 9, the wireless terminal 8 transmits a calling signal to "IP ADDRESS 1 OF MAIN SERVER 1" that is an access point server of "SSID 1". Accordingly, the calling signal transmitted from the wireless terminal 8 reaches the main server 1 through the AP 5. The main server 1 performs a calling process on the basis of the calling signal transmitted from the wireless terminal 8. Meanwhile, normally, "SSID 1" is set for both the wireless terminal 9 and the AP 6. The wireless terminal 9 performs a connection process to the AP 6 by the above-described normal scanning method. When a receiving signal is transmitted to the wireless terminal 9 by the calling process of the main server 1, the receiving signal transmitted to the wireless terminal 9 reaches the wireless terminal 9 through the AP 6. Accordingly, the wireless terminal 9 receives a call, thereby establishing the phone communication between the wireless terminal 8 and the wireless terminal 9. In addition, "SSID 1" corresponds to the first network identifier in the invention.

Next, an operation will be described where a failure has occurred in communication between the main server 1 and the access point.

Figure 5:
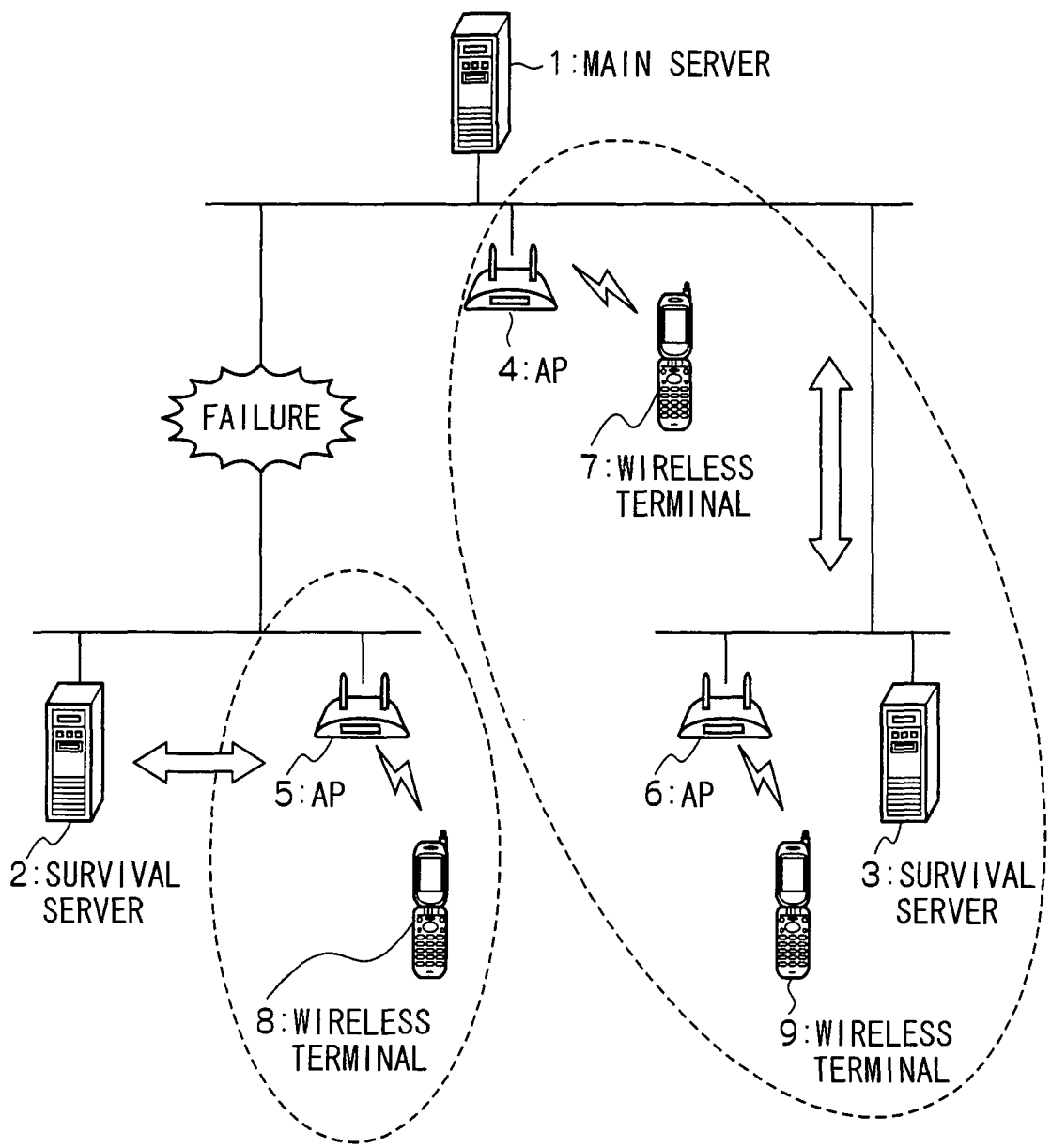
FIG. 5 is a diagram illustrating network connection at the time of a communication failure according to Embodiment 1.
Figure 6:
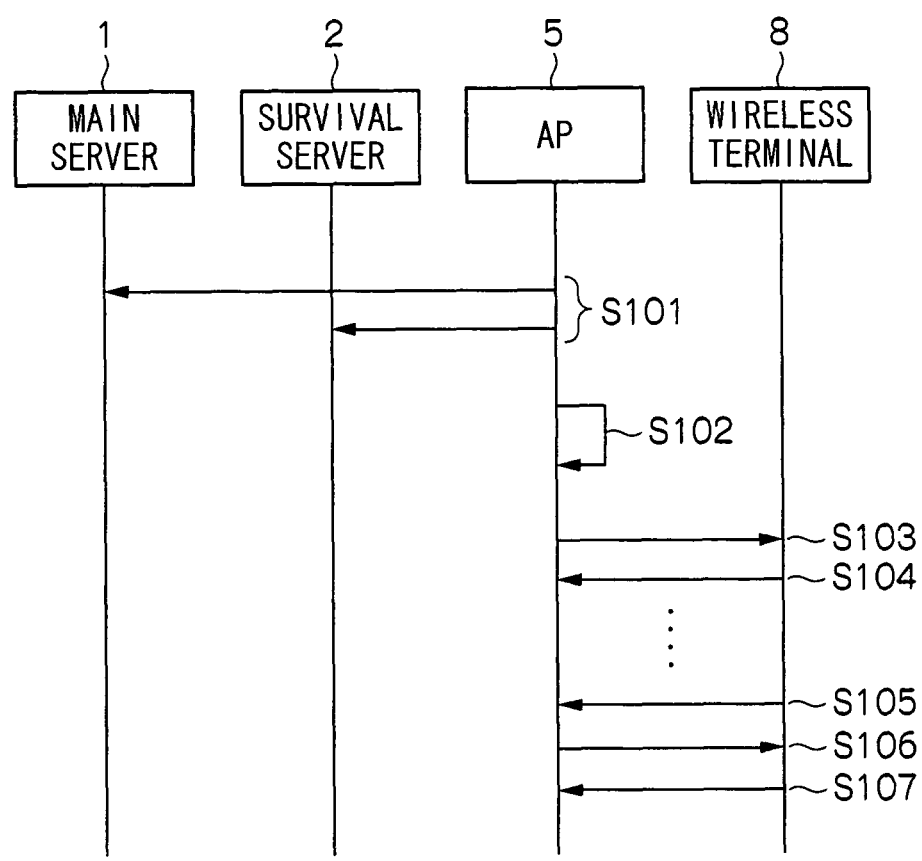
FIG. 6 is a sequence diagram illustrating a server switching operation according to Embodiment 1.

FIG. 5 is a diagram illustrating the network connection according to Embodiment 1 at the time of a communication failure. FIG. 6 is a sequence diagram illustrating a server switching operation according to Embodiment 1. As shown in FIG. 5, an operation when a failure has occurred in communication between the AP 5 and the main server 1 and communication between the AP 5 and the survival server 2 is normal will be described with reference to FIG. 6.

(S101) The monitoring unit 104 of the AP 5 monitors the communication state with "IP ADDRESS 1 OF MAIN SERVER 1" and "IP ADDRESS 2 OF SURVIVAL SERVER 2" of "MONITORING TARGET FLAG ON" through the wire LAN communication unit 101 on the basis of the profiles stored in the storage unit 103. In the state shown in FIG. 5, the monitoring unit 104 recognizes that a failure has occurred in the communication between the AP 5 and the main server 1, since the connection to the main server 1 has failed. In addition, the monitoring unit 104 recognizes that the communication between the AP 5 and the survival server 2 is normal, since the connection to the survival server 2 has succeeded.

(S102) When the connection to the main server 1 fails and the monitoring unit 104 of the AP 5 recognizes that a failure has occurred, the monitoring unit 104 sets monitoring target flag to ON in the profiles stored in the storage unit 103, sets the SSID to "SSID 2", and sets the corresponding scanning method to "ACTIVE" on the basis of "PROFILE NAME 2" including the survival server 2 which has a successful connection, in the wireless LAN communication unit 102. In addition, "SSID 2" corresponds to the second network identifier in the invention.

(S103) When the SSID is set to "SSID 2" and the corresponding scanning method is set to "ACTIVE" from the monitoring unit 104, the wireless LAN communication unit 102 of the AP 5 transmits the disconnection signal message (Deauthentication) to the wireless LAN and performs the recursion process.

(S104) When the wireless terminal 8 receives the disconnection signal message (Deauthentication) from the AP 5, the wireless terminal 8 is disconnected from the AP 5. Then, the wireless terminal 8 transmits the connection request signal message (Probe Request) in order to again scan the access point set to "SSID 1". In this case, the AP 5 does not respond since the AP 5 is set to "SSID 2".

(S105) When the wireless terminal 8 cannot acquire the access point set to "SSID 1", the wireless terminal 8 scans the access point set to "SSID 2" included in the other profile stored in the wireless terminal 8. Accordingly, the wireless terminal 8 transmits the connection request signal message (Probe Request).

(S106) Since the AP 5 is set to "SSID 2", the AP 5 responds by transmitting the connection response signal (Probe Response) including "SSID 2" set for the AP 5, in response to the received connection request signal (Probe Request).

(S107) When the wireless terminal 8 receives the connection response signal (Probe Response) from the AP 5, the wireless terminal 8 performs the connection process to the AP 5 set to the same "SSID 2" as that of the wireless terminal 8 and is connected to the wireless LAN by "SSID 2". Then, at the time of calling, the wireless terminal 8 transmits the calling signal to "IP ADDRESS 2 OF SURVIVAL SERVER 2" that is the access point server of "SSID 2". Accordingly, the calling signal transmitted from the wireless terminal 8 reaches the survival server 2 through the AP 5. The survival server 2 performs the calling process on the basis of the calling signal transmitted from the wireless terminal 8.

Figure 7:
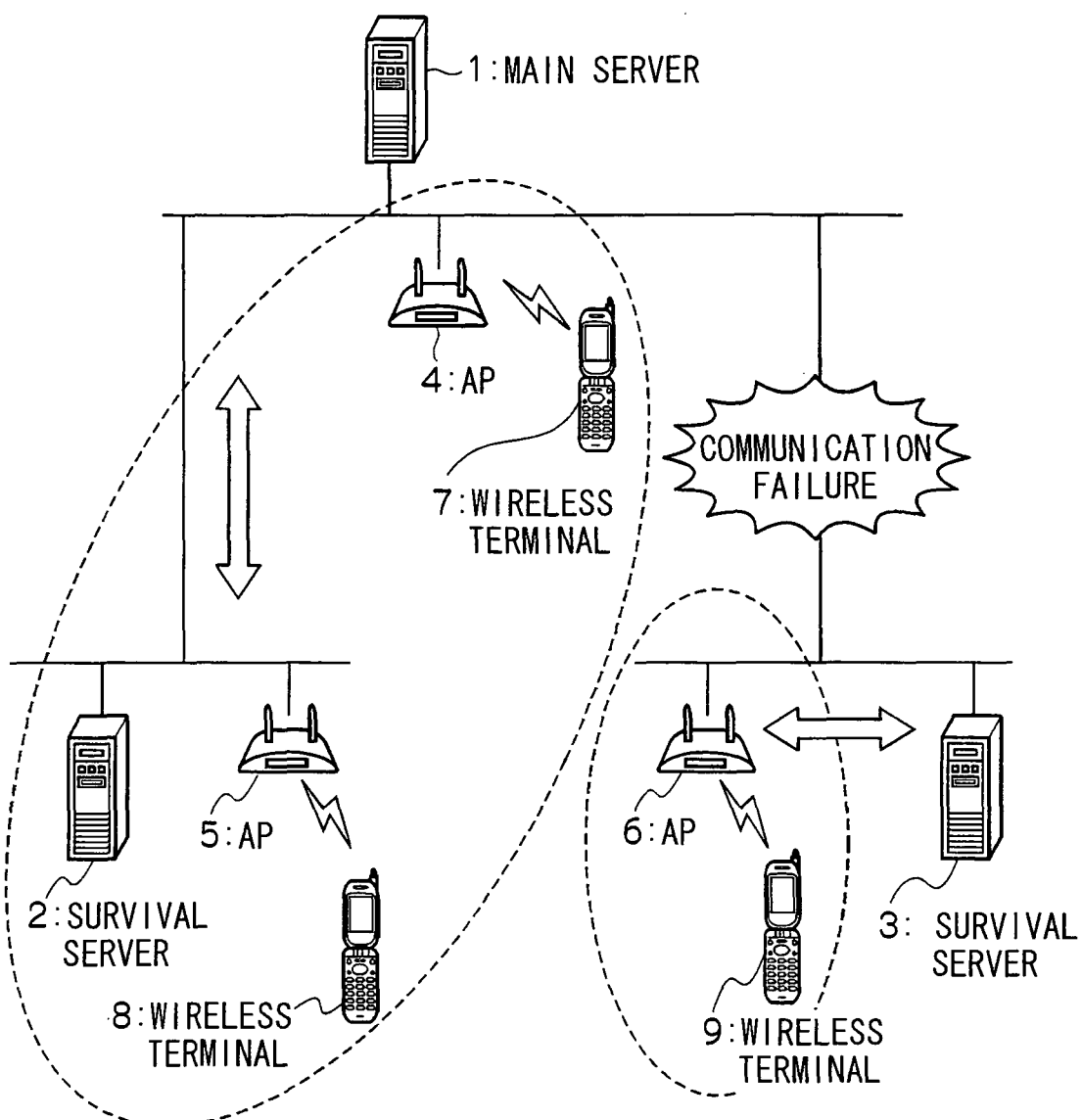
FIG. 7 is a diagram illustrating network connection at the time of a communication failure according to Embodiment 1.
Figure 8:
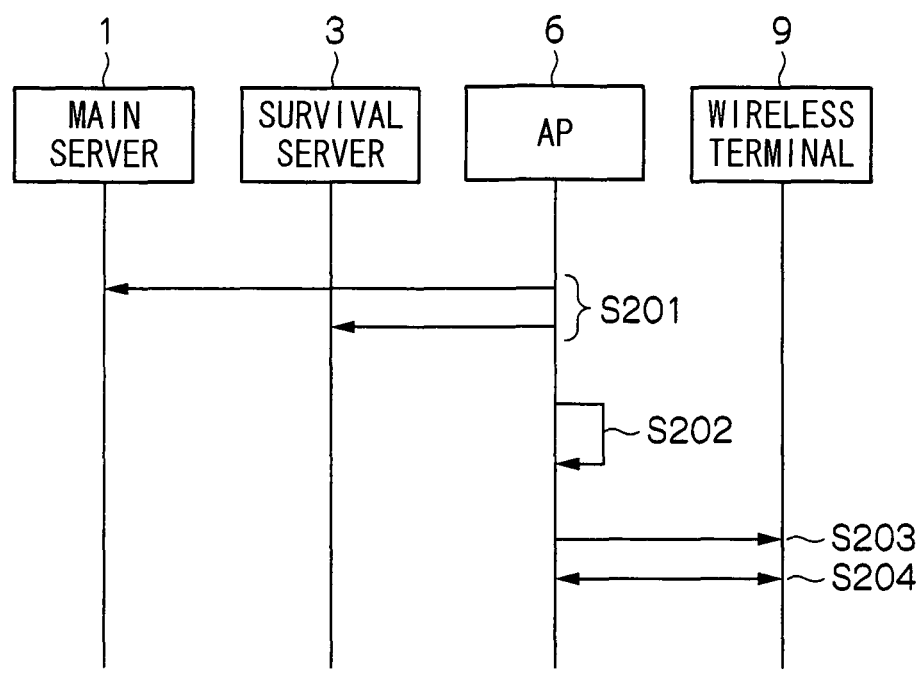
FIG. 8 is a sequence diagram illustrating a server switching operation according to Embodiment 1.

FIG. 7 is a diagram illustrating the network connection according to Embodiment 1 at the time of a communication failure. FIG. 8 is a sequence diagram illustrating a server switching operation according to Embodiment 1. As shown in FIG. 7, an operation when a failure has occurred in communication between the AP 6 and the main server 1 and communication between the AP 6 and the survival server 3 is normal will be described with reference to FIG. 8.

(S201) The monitoring unit 104 of the AP 6 monitors the communication state with "IP ADDRESS 1 OF MAIN SERVER 1" and "IP ADDRESS 3 OF SURVIVAL SERVER 3" of "MONITORING TARGET FLAG ON" through the wire LAN communication unit 101 on the basis of the profiles stored in the storage unit 103. In the state shown in FIG. 7, the monitoring unit 104 recognizes that a failure has occurred in the communication between the AP 6 and the main server 1, since the connection to the main server 1 has failed. In addition, the monitoring unit 104 recognizes that the communication between the AP 6 and the survival server 3 is normal, since the connection to the survival server 3 has succeeded.

(S202) When the connection to the server fails and the monitoring unit 104 of the AP 6 recognizes that a failure has occurred, the monitoring unit 104 sets monitoring target flag to ON in the profiles stored in the storage unit 103, sets the SSID to "SSID 3", and sets the corresponding scanning method to "PASSIVE" on the basis of "PROFILE NAME 3" including the survival server 3 which has a successful connection, in the wireless LAN communication unit 102. In addition, "SSID 3" corresponds to the second network identifier in the invention.

(S203) When the SSID is set to "SSID 3" and the corresponding scanning method is set to "PASSIVE" from the monitoring unit 104, the wireless LAN communication unit 102 of the AP 6 transmits the disconnection signal message (Deauthentication) and the control signal (beacon) including "SSID 3" set for the AP 6 to the wireless LAN and performs the recursion process.

(S204) When the wireless terminal 9 receives the disconnection signal message (Deauthentication) from the AP 6, the wireless terminal 9 is disconnected from the AP 6. In addition, the wireless terminal 9 receives the control signal (beacon) including "SSID 3" from the AP 6. When the wireless terminal 9 receives the control signal (beacon) including "SSID 3" from the AP 6, the SSID of the wireless terminal 9 is set to "SSID 3", and the wireless terminal 9 performs the connection process to the AP 6 and is connected to the wireless LAN by "SSID 3". Then, at the time of calling, the wireless terminal 8 transmits the calling signal to "IP ADDRESS 3 OF SURVIVAL SERVER 3" that is the access point server of "SSID 3". Accordingly, the calling signal transmitted from the wireless terminal 9 reaches the survival server 3 through the AP 6. The survival server 3 performs the calling process on the basis of the calling signal transmitted from the wireless terminal 9.

An operation when the communication failure has been repaired will be described. For example, the case of when the communication failure between the AP 5 and the main server 1 has been repaired shown in FIG. 5 will be described as an example.

The monitoring unit 104 of the AP 5 regularly or constantly monitors the communication state. The monitoring unit 104 of the AP 5 monitors the communication state between "IP ADDRESS 1 OF MAIN SERVER 1" and "IP ADDRESS 2 OF SURVIVAL SERVER 2" of "MONITORING TARGET FLAG ON" through the wire LAN communication 101, on the basis of the profiles stored in the storage unit 103. When the communication failure is repaired, the monitoring unit 104 recognizes that the communication between the AP 5 and the main server 1 and between the AP 5 and the survival server 2 is normal.

When a connection to the main server 1 has succeeded, the monitoring unit 104 of the AP 5 sets "SSID 1" of "PROFILE NAME 1" including the main server 1 in the wireless LAN communication unit 102. In addition, since there is no scanning method of the profile name 1 stored, a scanning method is not set for the wireless LAN communication unit 102. In this case, the wireless LAN communication unit 102 corresponds to the above-described normal scanning.

The wireless LAN communication unit 102 of the AP 5 transmits the disconnection signal message (Deauthenticiation) to the wireless LAN and performs the recursion process.

When the wireless terminal 8 receives disconnection signal message (Deauthenticiation) from the AP 5, the wireless terminal 8 is disconnected from the AP 5. Hereinafter, in the same manner of the above-described operation, the AP 5 is acquired by active scanning or passive scanning, the SSID of the wireless terminal 8 is set to "SSID 1", the connection process to the AP 5 is performed, and the connection to the wireless LAN is performed by "SSID 1". Then, at the time of calling, the wireless terminal 8 transmits the calling signal to "IP ADDRESS 1 OF MAIN SERVER 1" that is the access point server of "SSID 1". Accordingly, the calling signal transmitted from the wireless terminal 8 reaches the main server 1 through the AP 5. The main server 1 performs the calling process on the basis of the calling signal transmitted from the wireless terminal 8.

In the embodiment as described above, the access point detects the communication state between the server and the access point, and sets the SSID of the access point according to the communication state. The terminal communicates information with the main server 1, the survival server 2, or the survival server 3 according to the SSID. For this reason, even when the terminal cannot cope with the switching of servers using the same SSID, it is possible to performing the switching of servers. Accordingly, it is possible to avoid service use from becoming disabled.

In addition, registration is not repeated from terminals to a server that cannot communicate (register) information due to failures or the like, and thus it is possible to prevent network traffic.

The terminal sets the SSID of the access point capable of communicating as the SSID of the terminal, and sets the server corresponding to the SSID as the access point server. For this reason, even when the terminal moves from one base to another base, it is possible to perform registration to the appropriate server according to the communication state between the access point of the base and the server. That is, for example, when a communication failure has occurred between the main server 1 and the AP 5 in the base B and the wireless terminal 8 communicates information with the survival server 2 using "SSID 2" and then moves to the base C, it is possible to communicate information with the main server 1 by "SSID 1" set for the AP 6.

The terminal sets the SSID of the access point capable of communicating as the SSID of the terminal, and sets the server corresponding to the SSID as the access point server. For this reason, the terminal can switch access point servers without monitoring the communication state between the server and the access point. Accordingly, it is possible for the terminal to have a simple configuration.

In Embodiment 1, the case has been described where the disconnection signal message (Deauthentication) is transmitted to the wireless LAN when the SSID and the corresponding scanning method are set, but the invention is not limited thereto. That is, the disconnection signal message (Deauthentication) does not need to be transmitted to the wireless LAN. In this case, when the AP changes the SSID, the terminal cannot communicate with the AP. With such a configuration, even when the disconnection signal is not transmitted from the AP, the recursion process is performed by scanning the access point included in the other profile stored in the terminal when the terminal cannot acquire the AP.

Embodiment 2

In Embodiment 1, the AP monitors the communication state between the AP and the server. However, in Embodiment 2, the AP monitors the load state of the server. In the storage unit 103 of each AP in Embodiment 2, threshold load value data is stored in addition to the above-described profile data.

The configuration of the wireless communication system according to Embodiment 2 is the same as that of Embodiment 1, and the same reference numerals and signs are given to the same configurations.

FIG. 9 is a diagram illustrating threshold load value data stored in the storage unit of the AP. In FIG. 9, an example of the threshold load value data stored in the storage unit 103 of the AP 4 is shown.

As shown in FIG. 9, the threshold load value data includes IP addresses of monitoring target servers, threshold values of CPU use ratio, threshold values of memory use ratio, and threshold values of NW resource use rate.

Hereinafter, an operation in Embodiment 2 will be described with reference to the example of the threshold load value data stored in the AP 4.

The monitoring unit 104 requests information on a CPU use ratio, a memory use ratio, and an NW resource use rate using a message type based on SNMP (Simple Network Management Protocol) (RFC 1157, etc.), SNMP version 2 (RFC 1441, etc.), and SNMP version 3 (RFC 3411, etc.), from the monitoring target server. That is, the monitoring unit 104 of the AP 4 requests information to "IP ADDRESS 1 OF MAIN SERVER 1, "IP ADDRESS 2 OF SURVIVAL SERVER 2", and "IP ADDRESS 3 OF SURVIVAL SERVER 3". The monitoring unit 104 has a protocol stack to realize the information request using the message type based on SNMP, SNMP version 2, and SNMP version 3 creates and transmits the information request through the protocol stack. When the monitoring unit 104 obtains the information response, the monitoring unit 104 receives the information response through the protocol stack, thereby analyzing the information response. By expanding the protocol stack, it is possible to transmit the information request and to receive the information response using the message type of the expanded SNMP.

At least one out of the CPU use ratio, the memory use ratio, and the NW resource use rate corresponds to the load state in the invention.

The main server 1, the survival server 2, and the survival server 3 receiving the information request from the AP 4 and respond to the AP 4 with the information on the CPU use ratio, the memory use ratio, and the NW resource use rate of the server.

The monitoring unit 104 of the AP 4 obtains the information response from the main server 1, the survival server 2, and the survival server 3. The monitoring unit 104 recognizes that the server is in a high load state when the information coincides with the conditions set by the threshold values, with reference to the CPU use ratio, the memory use ratio, and the NW resource use rate included in the information response.

As shown in FIG. 9, in regard to the threshold load value data, cross-check with the information response is not performed at parts where there is no value for the threshold value (i.e., blank) for the CPU use ratio, the memory use ratio, and the NW resource use rate. That is, the monitoring unit 104 of the AP 4 checks whether or not the CPU use ratio is 90% or more with respect to the survival server 2, checks whether or not the CPU use ratio is 90% or more with respect to the survival server 3, and checks whether or not the memory use ratio is 85% or more.

Each AP constantly or periodically performs such detections of the load state.

Then, when the monitoring unit 104 of the AP recognizes that the server performing the information request is in the high load state, the monitoring unit 104 sets the monitoring target flag to ON, the SSID of the profile including the server which has a successful connection and is not in the high load state, and the corresponding scanning method in the profiles stored in the storage unit 103, in the wireless LAN communication unit 102. For example, in the AP 5, when it is recognized that the main server 1 is in the high load state, the survival server 2 is not in the high load state, and the connection to the survival server 2 has succeeded, the SSID is set to "SSID 2" and the corresponding scanning method is set to "ACTIVE" in the wireless LAN communication unit 102, on the basis of the "PROFILE NAME 2" shown in FIG. 3B.

The subsequent operation is the same as that of Embodiment 1.

In the embodiment as described above, the access point detects the load state of the server, and sets the SSID of the access point according to the load state. The terminal communicates information with the main server 1, the survival server 2, or the survival server 3 according to the SSID. Accordingly, the AP can switch the SSID and can connect the terminal to another server before failure occurs, when a failure may occur due to the high load state of the server.

In Embodiment 1, the monitoring unit 104 switches the SSID by recognizing the failure with the connection request with at least one out of the ICMP ping using the message type based on RFC 792 and the SIP protocol using the SIP message based on RFC 3261. In Embodiment 2, the monitoring unit 104 switches the SSID by recognizing the high load state with the information request using the message type of SNMP, SNMP version 2, or SNMP version 3. The invention is not limited thereto, and the SSID may be switched on the basis of either or both of the communication failure and the high load state. That is, the monitoring unit 104 may select to perform only the failure recognition, only the load recognition, or the failure recognition and the load recognition, by setting the failure recognition and the load recognition for the monitoring unit 104.

Embodiment 3

In Embodiment 1, the AP monitors the communication state with the server, and sets the network identifier (SSID) of the AP on the basis of the communication state. In Embodiment 2, the AP monitors the load state of the server, and sets the network identifier of the AP on the basis of the load state. In Embodiment 3, a controller monitors the communication state with the server, and sets the network identifier of the AP on the basis of the communication state. Hereinafter, a case will be described where the wireless communication system according to the invention is applied to a controller-type wireless IP phone system.

First, a configuration of the wireless communication system according to Embodiment 3 will be described on the basis of the difference from Embodiment 1. In addition, the same reference numerals and signs are given to the same configurations as those of Embodiment 1.

Figure 10:
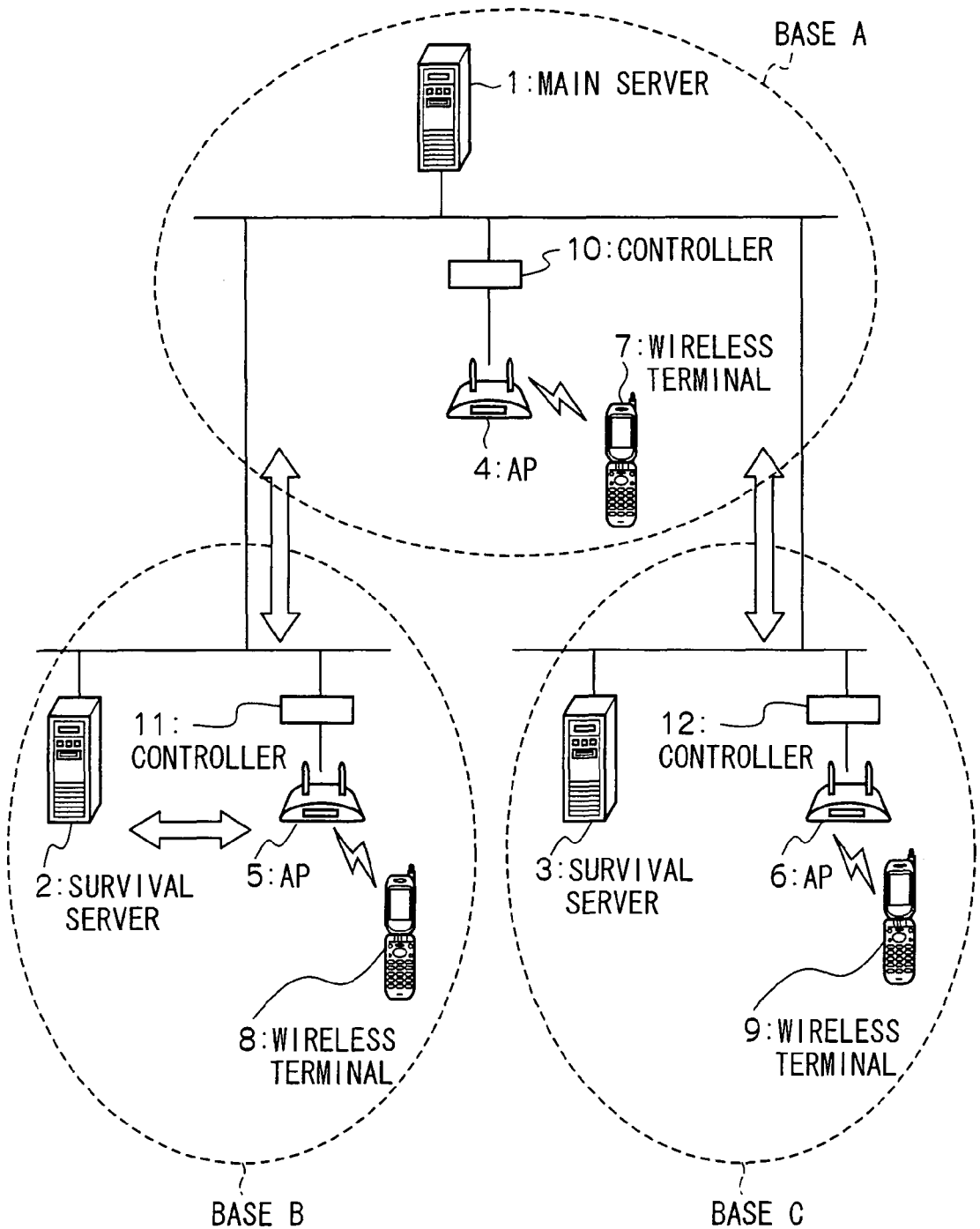
FIG. 10 is a diagram illustrating a configuration of a wireless IP phone system according to Embodiment 3.

FIG. 10 is a diagram illustrating a configuration of a wireless IP phone system according to Embodiment 3. As shown in FIG. 10, the wireless IP phone system according to Embodiment 3 is provided with a controller 10, a controller 11, and a controller 12, in addition to the configuration of the wireless IP phone system (FIG. 1) according to Embodiment 1. In addition, the configurations of the main server 1, the survival servers 2 and 3, and the wireless terminals 7 to 9 are the same as those of Embodiment 1.

The controller 10, the controller 11, and the controller 12 (hereinafter, simply referred to as "controller" in the case of no distinction) are respectively connected to the main server 1, the survival server 2, and the survival server 3 by the wire LAN, and can communicate with each other.

The controller is installed in each base. The controller accepts (accesses to) the AP in the base. The controller controls the accepted AP, and operates the wireless LAN. In Embodiment 3, the case where each of the controllers 10 to 12 accepts one AP is represented, but they may accept plural APs.

The controller controls the settings for the AP. The details thereof will be described later. In addition, the controller can perform access control and traffic control for the AP. For example, there is access control (FW (Firewall), PF (Packet Filtering), etc.) for traffic flowing in from the AP, and the like. In addition, there is traffic control (QoS (Quality of Service), etc.) for traffic flowing in from the AP. In addition, there is access control for traffic flowing in from a backbone. In addition, there is traffic control for traffic flowing in from the backbone. The backbone is the LAN of the base A connected to the main server 1 in case of the controller 10.

In embodiment 3, the controller controls the settings for the AP, thereby setting the network identifier (SSID) of the AP. For this reason, in Embodiment 3, the controller monitors the communication state with the server, and sets the network identifier of the AP on the basis of the communication state.

Each terminal communicates information with the main server 1, the survival server 2, or the survival server 3 through the AP and the controller. For example, the wireless terminal 8 in the base B communicates information with the main server 1 or the survival server 2 through the AP 5 and the controller 11, and communicates with the terminal (e.g., wireless terminal 7, etc.) in each base.

Next, a configuration of the controller will be described.

Figure 11:
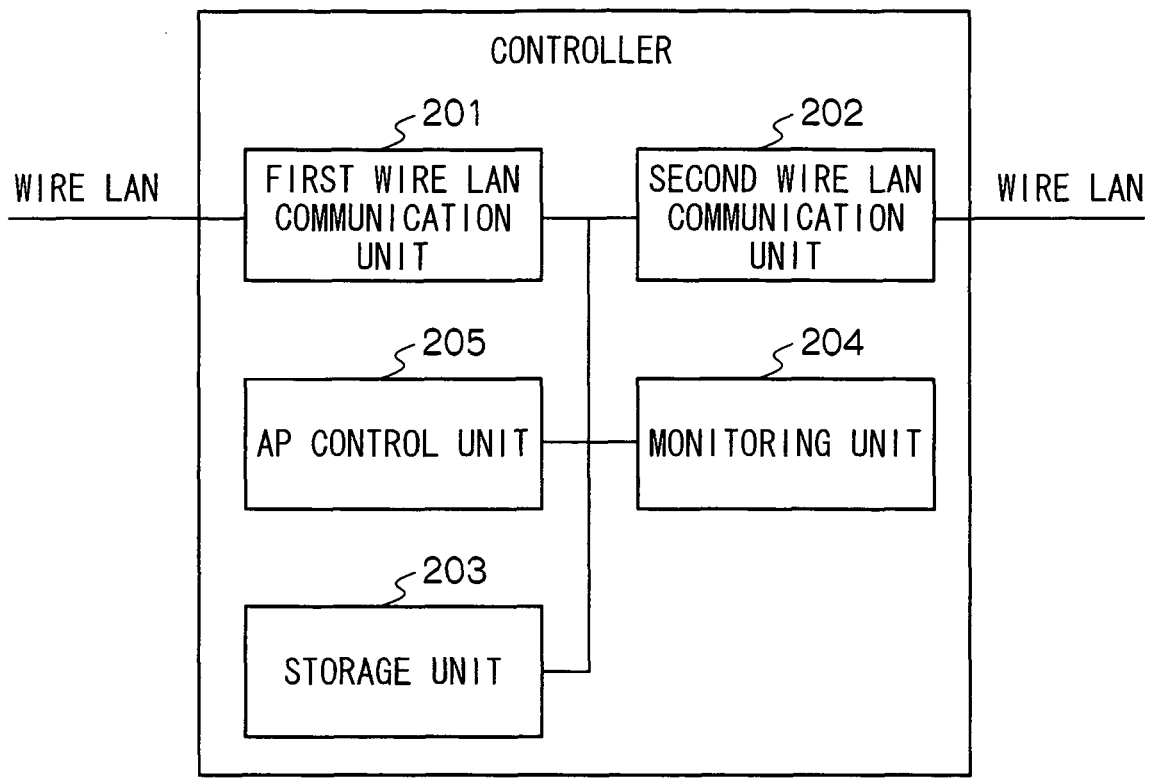
FIG. 11 is a diagram illustrating a configuration of a controller according to Embodiment 3.

FIG. 11 is a diagram illustrating the controller according to Embodiment 3. As shown in FIG. 11, the controller includes a first wire LAN communication unit 201, a second wire LAN communication unit 202, a storage unit 203, a monitoring unit 204, and an AP control unit 205.

The first wire LAN communication unit 201 is connected to the wire LAN of the base. The second wire LAN communication unit 202 is connected to the wire LAN and communicates with the AP. The first wire LAN communication unit 201 and the second wire LAN communication unit 202 are connected to each other and can relay communication. The storage unit 203 stores plural profiles therein.

Profile data stored in the storage unit 203 of the controllers 10 to 12 is the same as the profile data (FIGS. 3A to 3C) stored in the storage unit 103 of the AP 4 to the AP 6 in Embodiment 1.

That is, the storage unit 203 of the controller 10 accepting the AP 4 stores the profile shown in FIG. 3A therein. In addition, the storage unit 203 of the controller 11 accepting the AP 5 stores the profile shown in FIG. 3B therein. In addition, the storage unit 203 of the controller 12 accepting the AP 6 stores the profile shown in FIG. 3C therein. As described above, the profiles stored in the storage unit 203 are different for each controller.

When one controller accepts plural APs, plural profiles for the plural APs are stored in the storage unit 203. In this case, to refer to the plural profiles for each AP, for example, an AP identifier such as a name or an IP address of the AP and the plural profiles for each of the plural APs are stored together in pairs. Accordingly, it is possible to refer to the plural profiles for each AP using the AP identifier as a key.

The monitoring unit 204 of the controllers 10 to 12 monitors the server on the basis of the profiles stored in the storage unit 203. The monitoring unit 204 monitors the main server 1 and the survival servers 2 and 3 set to "MONITORING TARGET FLAG ON" on the basis of the monitoring target flag stored in the storage unit 203.

That is, as shown in FIG. 3A, in the storage unit 203 of the controller 10, "IP ADDRESS 1 OF MAIN SERVER 1" is set to "MONITORING TARGET FLAG ON", and thus the monitoring unit 204 of the controller 10 performs the monitoring on the basis of "IP ADDRESS 1 OF MAIN SERVER 1". Similarly, the controllers 11 and 12 also perform the monitoring on the basis of the profiles stored in the storage unit 203.

"IP ADDRESS 1 OF MAIN SERVER 1", "IP ADDRESS 2 OF SURVIVAL SERVER 2", and "IP ADDRESS 3 OF SURVIVAL SERVER 3" correspond to the identification information on the main server or the survival server in the invention.

The monitoring unit 204 monitors (detects) the communication state between the server and the controller. In the same manner as Embodiment 1, the means for monitoring the communication state requests connection with at least one out of the ICMP ping and the SIP protocol using the SIP message, and obtains the connection response from the server, thereby detecting the communication state. When the monitoring unit 204 requests the connection and can obtain the connection response from the server, the monitoring unit 204 recognizes that the connection has succeeded and that the communication between the server and the controller is normal. In addition, when the monitoring unit 204 requests the connection and cannot obtain the connection response from the server, the monitoring unit 204 recognizes that the connection has failed and that there is a communication failure between the server and the controller.

When the connection to the server fails and the monitoring unit 204 of the controller recognized that a failure has occurred, the monitoring unit 204 of the controller set the monitoring target flag to ON, the SSID of the profile including the server which has a successful connection, and the corresponding scanning method in the profiles stored in the storage unit 203, in the AP control unit 205. In addition, there is no profile scanning method stored, and the scanning method is not set.

The AP control unit 205 controls the AP on the basis of the monitoring of the monitoring unit 204. In addition, the AP control unit 205 keeps the SSID set for the AP and the corresponding scanning method to control the AP. In addition, there is no profile scanning method stored, and the scanning method is not kept.

The settings for the AP controlled by the AP control unit 205 will be described. First, the AP control unit 205 performs the initial settings control for the AP immediately after the controller has been started. When the controller is started, the AP control unit 205 keeps the SSID from the profiles stored in the storage unit 203. The AP control unit 205 transmits a settings signal including the information on the SSID to the AP connected to the controller through the second wire LAN communication unit. Accordingly, the SSID is set for the AP. In the SSID of the AP set at the time of starting, the SSID represented at the top in the profiles stored in the storage unit 203 is set as the SSID for setting the initial settings control in order to set the same SSID at the AP in each base.

That is, for example, the storage unit 203 of the controller 10 is represented by "SSID 1" at the top as shown in FIG. 3A, and the AP control unit 205 of the controller 10 sets "SSID 1" for the AP 4 at the initial settings control. Similarly, the controllers 11 and 12 set "SSID 1" shown at the top of the profiles stored in the storage unit 203, for the AP 5 and the AP 6.

The SSID of each AP accepted by each controller is the same due to the initial settings control.

In the above-described initial settings control, the SSID is set for the AP at the time of starting the controller, but the invention is not limited thereto. For example, when the AP requests the settings from the controller at the time of starting, the controller which receives the request for the settings may set the SSID kept in the AP control unit 205 and the corresponding scanning method in the AP which requested the settings.

Next, the AP control unit 205 controls the settings for the AP as control based on the monitoring by the monitoring unit 204. After the initial settings control, the AP control unit 205 sets the SSID given from the monitoring unit 204 and the corresponding scanning method for the AP, when the connection to the server fails and the monitoring unit 204 recognizes that a failure has occurred in the communication between the server and the controller. This setting is performed by transmitting the settings signal including the information on the SSID set for the AP and the corresponding scanning method through the second wire LAN communication unit 202. In addition, there is no profile scanning method stored, and the scanning method is not set.

When the controller accepts plural APs, the settings signal including the AP identifier of the AP as the settings target can determine the AP of the settings target, in the above-described initial settings control and the settings control.

Next, a configuration of the AP will be described.

Figure 12:
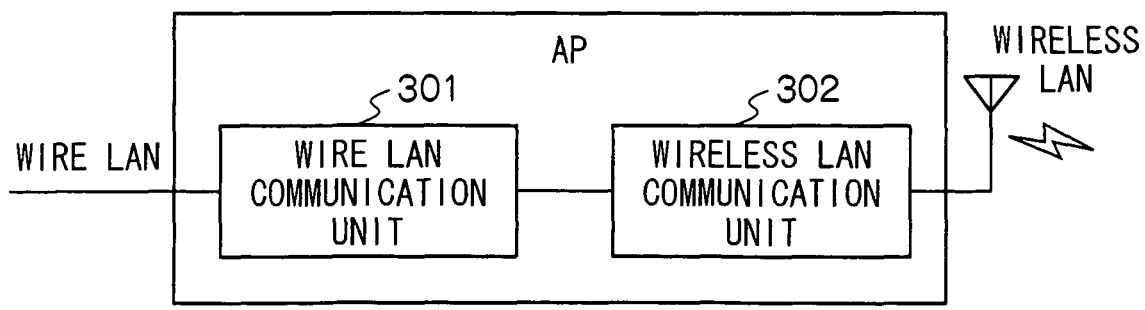
FIG. 12 is a diagram illustrating a configuration of an access point according to Embodiment 3.

FIG. 12 is a diagram illustrating a configuration of the access point according to Embodiment 3. As shown in FIG. 12, the AP includes a wire LAN communication unit 301 and a wireless LAN communication unit 302. The wire LAN communication unit 301 is connected to the wire LAN and is connected to the controller. The wireless LAN communication unit 302 is connected to the wireless LAN. The wire LAN communication unit 301 and the wireless LAN communication unit 302 are connected to each other and can relay communication.

The SSID and the corresponding scanning method (only when the scanning method is set) are set in the wireless LAN communication unit 302 by the initial settings control and the settings control from the controller.

This setting will be described in detail. In the initial settings control and the settings control of the AP control unit 205 of the controller, the settings signal is transmitted. The settings signal reaches the wire LAN communication unit 301 of the AP. A control unit (not shown in FIG. 12) of the AP sets the wireless LAN communication unit 302 on the basis of the settings signal. The control unit of the AP is a CPU (Central Processing Unit), a DSP (Digital Signal Processor), or the like provided in the AP.

When the controller accepts plural APs, the settings signal including the AP identifier is transmitted from the controller. When the AP identifier is included in the settings signal, the control unit of the AP determines whether or not the AP including the AP is the settings target on the basis of the AP identifier. Then, when the AP is the settings target, and the control unit of the AP sets the wireless LAN communication unit 302 on the basis of the settings signal.

Next, an operation will be described when a failure has occurred in communication between the main server 1 and the controller.

Figure 13:
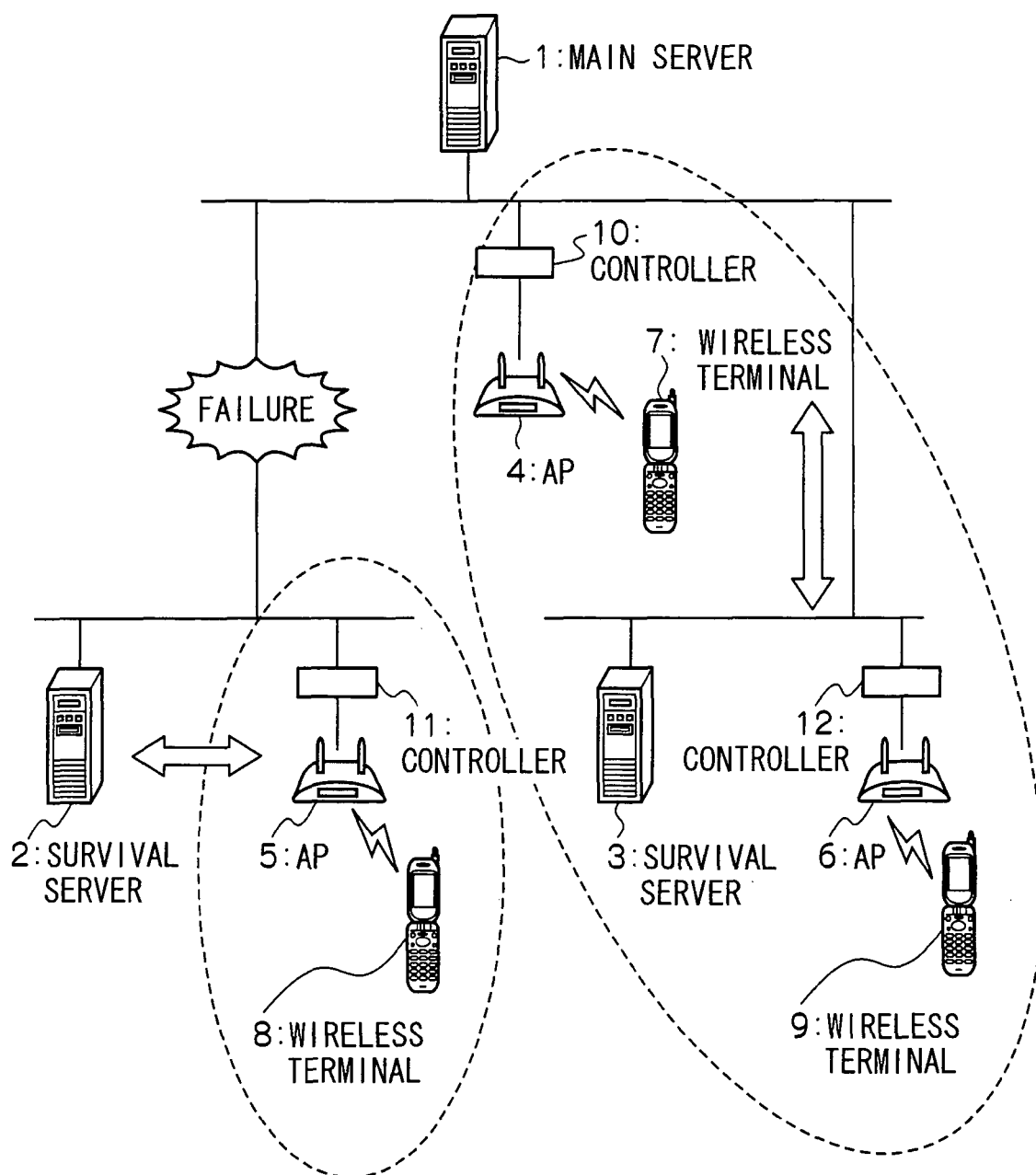
FIG. 13 is a diagram illustrating network connection at the time of a communication failure according to Embodiment 3.
Figure 14:
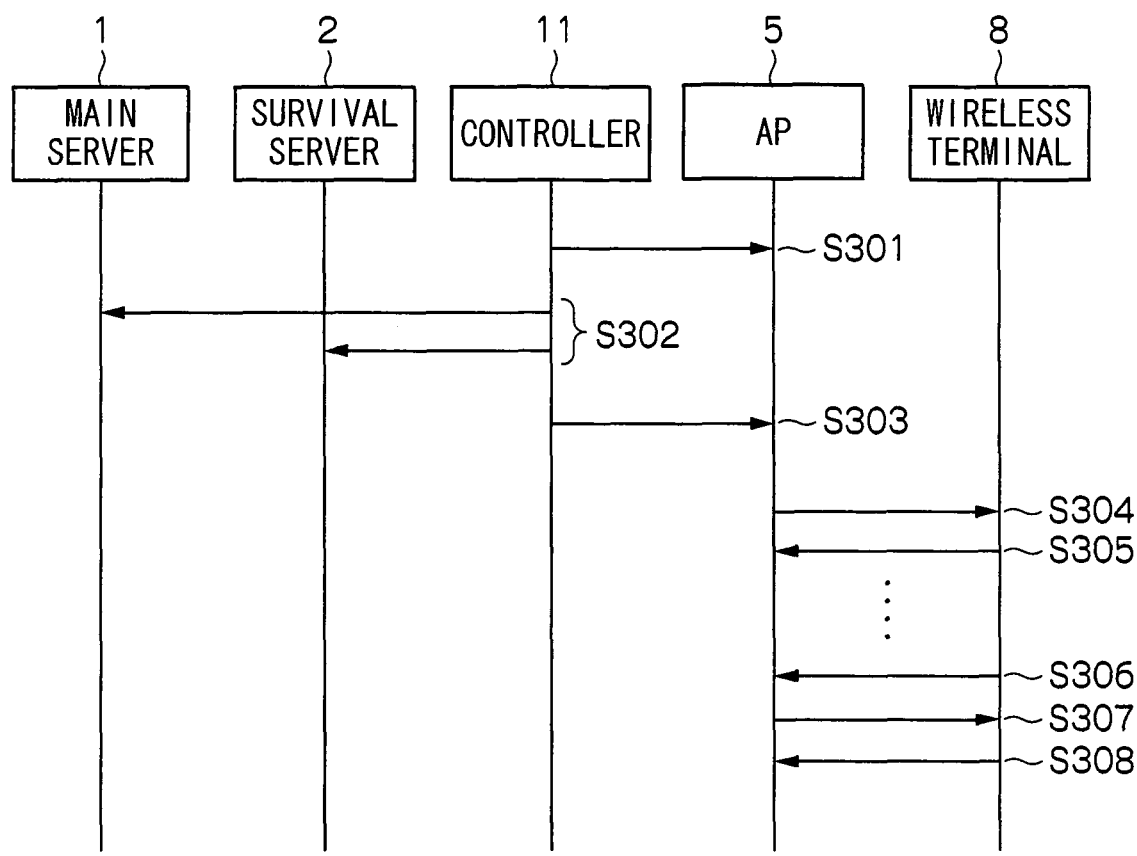
FIG. 14 is a sequence diagram illustrating a server switching operation according Embodiment 3.

FIG. 13 is a diagram illustrating the network connection according to Embodiment 3 at the time of a communication failure. FIG. 14 is a sequence diagram illustrating a server switching operation according to Embodiment 3. As shown in FIG. 13, an operation when a failure has occurred in communication between the controller 11 and the main server 1 and communication between the controller 11 and the survival server 2 is normal will be described with reference to FIG. 14.

(S301) First, the AP control unit 205 of the controller 11 keeps "SSID 1" shown at the top of the profiles stored in the storage unit 203, and sets "SSID 1" for the AP 5 by the initial settings control. When the SSID is set, the AP 5 can transmit the control signal (beacon) including the set "SSID 1". At this time, the AP 5 corresponds to the normal scanning since the corresponding scanning method is not set.

Normally, the wireless terminal 8 performs a connection process to the AP 5 by the normal scanning method described in Embodiment 1. The wireless terminal 8 transmits a calling signal to "IP ADDRESS 1 OF MAIN SERVER 1" that is the access point server of "SSID 1". Accordingly, the communication information transmitted from the wireless terminal 8 reaches the main server 1 through the AP 5 and the controller 11. Normally, a calling process and an operation of establishing the phone communication are the same as those of Embodiment 1.

(S302) The monitoring unit 204 of the controller 11 monitors the communication state with "IP ADDRESS 1 OF MAIN SERVER 1" and "IP ADDRESS 2 OF SURVIVAL SERVER 2" of "MONITORING TARGET FLAG ON" through the first wire LAN communication unit 201 on the basis of the profiles stored in the storage unit 203. In the state shown in FIG. 13, the monitoring unit 204 recognizes that a failure has occurred in the communication between the controller 11 and the main server 1 as the connection to the main server 1 has failed. In addition, the monitoring unit 204 recognizes that the communication between the controller 11 and the survival server 2 is normal, since the connection to the survival server 2 has succeeded.

(S303) When the connection to the main server 1 fails and the monitoring unit 204 of the controller 11 recognizes that a failure has occurred, the monitoring unit 204 gives the settings information of the monitoring target flag ON, "SSID 2" of the SSID on the basis of "PROFILE NAME 2" including the survival server 2 which has a successful connection, and the corresponding scanning method "ACTIVE" in the profiles stored in the storage unit 203, to the AP control unit 205. Subsequently, the AP control unit 205 of the controller 11 performs the settings control on the basis of the given settings information, and sets the AP 5. At this time, the AP control unit 205 transmits the settings signal including the settings information of "SSID 2" and the corresponding scanning method "ACTIVE" through the second wire LAN communication unit 202.

(S304) The wireless LAN communication unit 302 of the AP 5 sets the "SSID 2" and the corresponding scanning method to "ACTIVE" for the AP 5 on the basis of the received settings signal. When the wireless LAN communication unit 302 of the AP 5 completes the settings, the wireless LAN communication unit 302 of the AP 5 transmits the disconnection signal message (Deauthentication) to the wireless LAN and performs the recursion process.

(S305) When the wireless terminal 8 receives the disconnection signal message (Deauthentication) from the AP 5, the wireless terminal 8 is disconnected from the AP 5. Then, the wireless terminal 8 transmits the connection request signal message (Probe Request) in order to again scan the access point set to "SSID 1". In this case, the AP 5 does not respond since the AP 5 is set to "SSID 2".

(S306) When the wireless terminal 8 cannot acquire the access point set to "SSID 1", the wireless terminal 8 transmits the connection request signal message (Probe Request) in order to scan the access point set to "SSID 2" included in the other profile stored in the wireless terminal 8.

(S307) Since the AP 5 is set to "SSID 2", the AP 5 responds by transmitting the connection response signal (Probe Response) including "SSID 2" set for the AP 5, in response to the received connection request signal (Probe Request).

(S308) When the wireless terminal 8 receives the connection response signal (Probe Response) from the AP 5, the wireless terminal 8 performs the connection process to the AP 5 set to the same "SSID 2" as that of the wireless terminal 8 and is connected to the wireless LAN by "SSID 2". Then, at the time of calling, the wireless terminal 8 transmits the calling signal to "IP ADDRESS 2 OF SURVIVAL SERVER 2" that is the access point server of "SSID 2". Accordingly, the calling signal transmitted from the wireless terminal 8 reaches the survival server 2 through the AP 5 and the controller 11. The survival server 2 performs the calling process on the basis of the calling signal transmitted from the wireless terminal 8.

"SSID 1" corresponds to the first network identifier in the invention, and "SSID 2" corresponds to the second network identifier in the invention.

Figure 15:
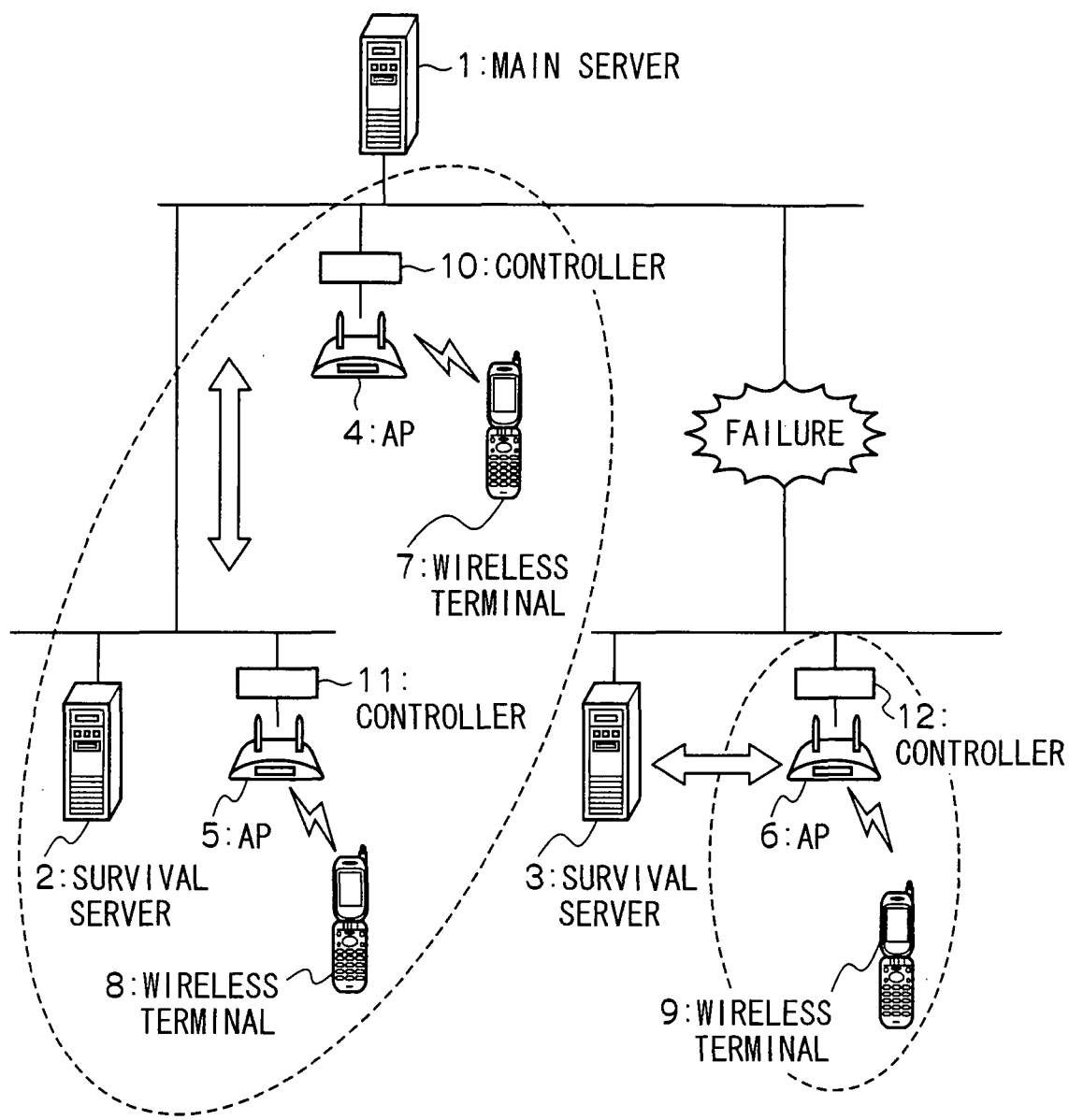
FIG. 15 is a diagram illustrating network connection at the time of a communication failure according to Embodiment 3.
Figure 16:
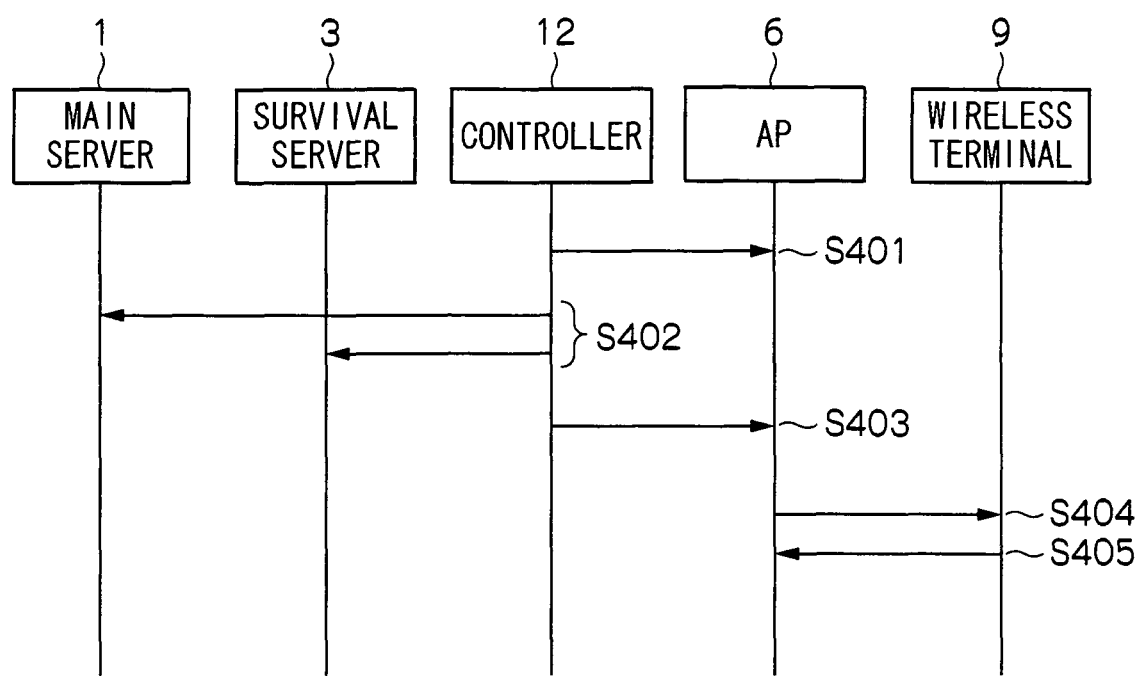
FIG. 16 is a sequence diagram illustrating a server switching operation according to Embodiment 3.

FIG. 15 is a diagram illustrating the network connection according to Embodiment 3 at the time of a communication failure. FIG. 16 is a sequence diagram illustrating a server switching operation according to Embodiment 3. As shown in FIG. 15, an operation when a failure has occurred in communication between the controller 12 and the main server 1 and communication between the controller 12 and the survival server 3 is normal will be described with reference to FIG. 16.

(S401) First, the AP control unit 205 of the controller 12 keeps "SSID 1" shown at the top of the profiles stored in the storage unit 203, and sets "SSID 1" for the AP 6 by the initial settings control. When the SSID is set, the AP 6 can transmit the control signal (beacon) including the set "SSID 1". At this time, the AP 6 corresponds to normal scanning since the corresponding scanning method is not set.

Normally, the wireless terminal 9 performs a connection process to the AP 6 by the normal scanning method described in Embodiment 1. The wireless terminal 9 transmits a calling signal to "IP ADDRESS 1 OF MAIN SERVER 1" that is the access point server of "SSID 1". Accordingly, the communication information transmitted from the wireless terminal 9 reaches the main server 1 through the AP 6 and the controller 12. Normally, a calling process and an operation such as establishing the phone communication are the same as those of Embodiment 1.

(S402) The monitoring unit 204 of the controller 12 monitors the communication state with "IP ADDRESS 1 OF MAIN SERVER 1" and "IP ADDRESS 3 OF SURVIVAL SERVER 3" of "MONITORING TARGET FLAG ON" through the first wire LAN communication unit 201 on the basis of the profiles stored in the storage unit 203. In the state shown in FIG. 15, the monitoring unit 204 recognizes that a failure has occurred in the communication between the controller 12 and the main server 1, since the connection to the main server 1 has failed. In addition, the monitoring unit 204 recognizes that the communication between the controller 12 and the survival server 3 is normal, since the connection to the survival server 3 has succeeded.

(S403) When the connection to the main server 1 fails and the monitoring unit 204 of the controller 12 recognizes that a failure has occurred, the monitoring unit 204 gives the settings information of the monitoring target flag ON, "SSID 3" of the SSID on the basis of "PROFILE NAME 3" including the survival server 3 which has a successful connection, and the corresponding scanning method "PASSIVE" in the profiles stored in the storage unit 203, to the AP control unit 205. Subsequently, the AP control unit 205 of the controller 12 performs the settings control on the basis of the given settings information, and sets the AP 6. At this time, the AP control unit 205 transmits the settings signal including the settings information of "SSID 3" and the corresponding scanning method "PASSIVE through the second wire LAN.

(S404) The wireless LAN communication unit 302 of the AP 6 sets the "SSID 3" and the corresponding scanning method to "PASSIVE" for the AP 6 on the basis of the received settings signal. When the wireless LAN communication unit 302 of the AP 6 completes the settings, the wireless LAN communication unit 302 of the AP 6 transmits the disconnection signal message (Deauthentication) and the control signal (beacon) including "SSID 3" set for the AP 6 to the wireless LAN and performs the recursion process.

(S405) When the wireless terminal 9 receives the message disconnection signal (Deauthentication) from the AP 6, the wireless terminal 9 is disconnected from the AP 6. In addition, the wireless terminal 9 receives the control signal (beacon) including "SSID 3" from the AP 6. When the wireless terminal 9 receives the control signal (beacon) including "SSID 3" from the AP 6, the SSID of the wireless terminal 9 is set to "SSID 3", and the wireless terminal 9 performs the connection process to the AP 6 and is connected to the wireless LAN by "SSID 3". Then, at the time of calling, the wireless terminal 9 transmits the calling signal to "IP ADDRESS 3 OF SURVIVAL SERVER 3" that is the access point server of "SSID 3". Accordingly, the calling signal transmitted from the wireless terminal 9 reaches the survival server 3 through the AP 6 and the controller 12. The survival server 3 performs the calling process on the basis of the calling signal transmitted from the wireless terminal 9.

"SSID 1" corresponds to the first network identifier in the invention, and "SSID 3" corresponds to the second network identifier in the invention.

In the embodiment as described above, the controller detects the communication state between the server and the controller, and sets the SSID of the access point on the basis of the communication state. The terminal communicates information with the main server 1, the survival server 2, or the survival server 3 according to the SSID. For this reason, it is possible to obtain the same advantages as Embodiment 1.

The monitoring of the communication state of the server is performed by the controller, and the settings control of the SSID is performed for the AP. For this reason, it is possible to simplify the configuration of the AP. In addition, it is possible to establish a system capable of server switching by adding the controller to the existing network system.

In Embodiment 3, the case has been described where setting the SSID of the AP is performed on the basis of the communication state, but the invention is not limited thereto and the SSID of the AP may be set on the basis of the load state of the server described in Embodiment 2. In addition, the SSID may be switched on the basis of either or both of the communication failure and the high load state. That is, the monitoring unit 204 of the controller may select to perform only the failure recognition or only the load recognition, otherwise, the failure recognition and the load recognition, by setting the failure recognition and the load recognition for the monitoring unit 204 of the controller. In this case, the monitoring unit 204 may perform the load monitoring by the same operation as that of the monitoring unit 104 according to Embodiment 2.

Embodiment 4

In Embodiment 3, the controller monitors the communication state with the server, and sets the network identifier (SSID) of the AP on the basis of the communication state. In embodiment 4, a network management device monitors the communication state with the server, and sets the network identifier of the AP on the basis of the communication state. Hereinafter, a case where the wireless communication system according to the invention is applied to a wireless IP phone system managed by the network management device will be described.

First, a configuration of the wireless communication system according to Embodiment 4 will be described on the basis of differences from Embodiment 1 and Embodiment 3. In addition, the same reference numerals and signs are given to the same configurations as those of Embodiment 1 and Embodiment 3.

Figure 17:
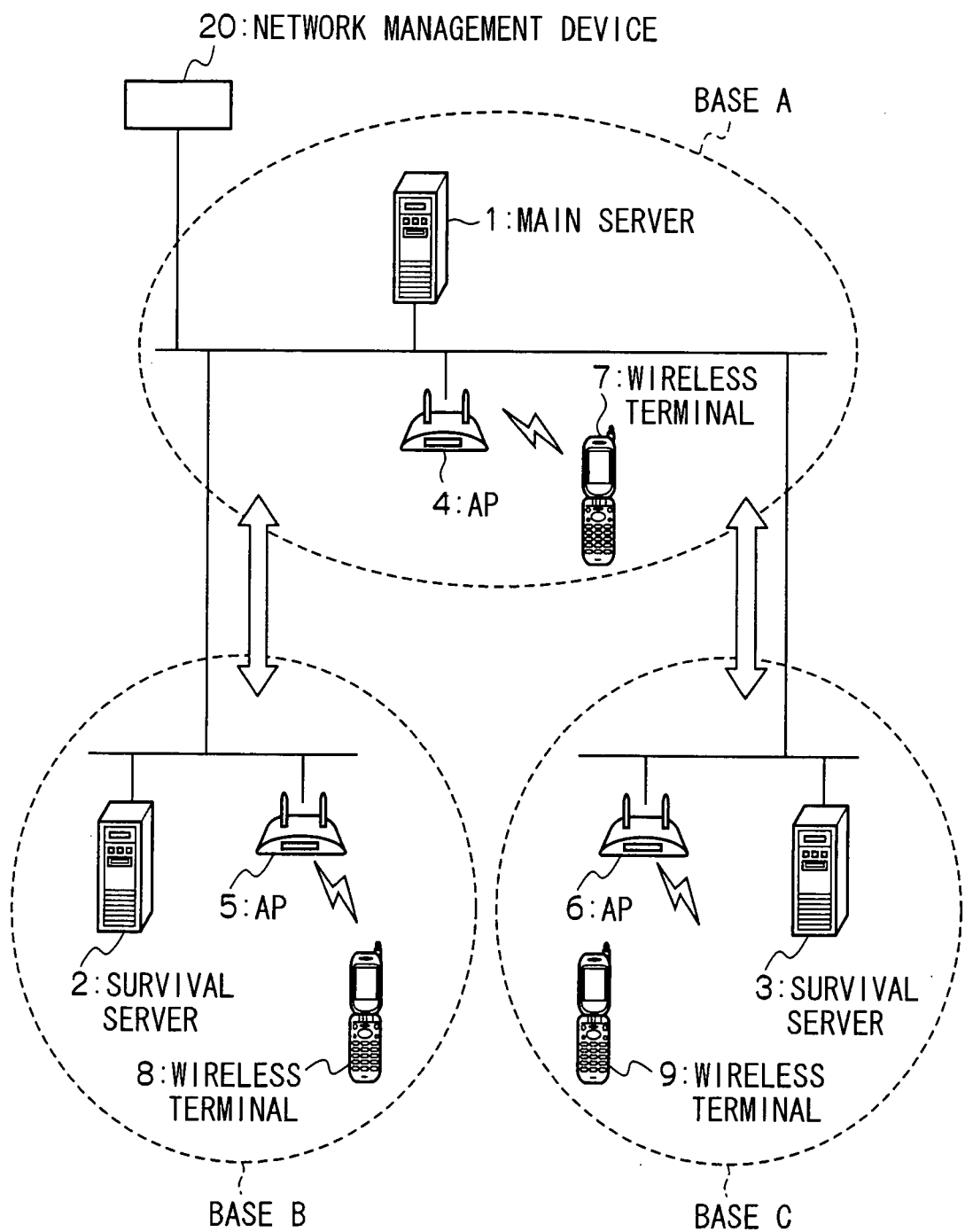
FIG. 17 is a diagram illustrating a configuration of a wireless IP phone system according to Embodiment 4.

FIG. 17 is a diagram illustrating a configuration of a wireless IP phone system according to Embodiment 4. As shown in FIG. 17, the wireless IP phone system according to Embodiment 4 is provided with a network management device 20, in addition to the configuration of the wireless IP phone system (FIG. 1) according to Embodiment 1. In addition, the configurations of the main server 1, the survival servers 2 and 3, and the wireless terminals 7 to 9 are the same as those of Embodiment 1.

The network management device 20 communicates with the AP through a network. The network management device 20 requests information from a node (including the server and the AP) on the network using a message type of SNMP and SNMP v2, and acquires information from the node, thereby performing network management. Accordingly, in the wireless IP phone system shown in FIG. 17, the wireless LAN is operated which is managed by the network management device 20. The network management device 20 monitors (detects) the communication state of the server. That is, the network management device 20 manages the network and monitors the communication state.

The network management device 20 may be a system or a service having a network management device. In this case, an AP control unit 405, a monitoring unit 404, and a storage unit 403 to be described later are included in the system and the service.

Next, a configuration of the network management device 20 will be described.

Figure 18:
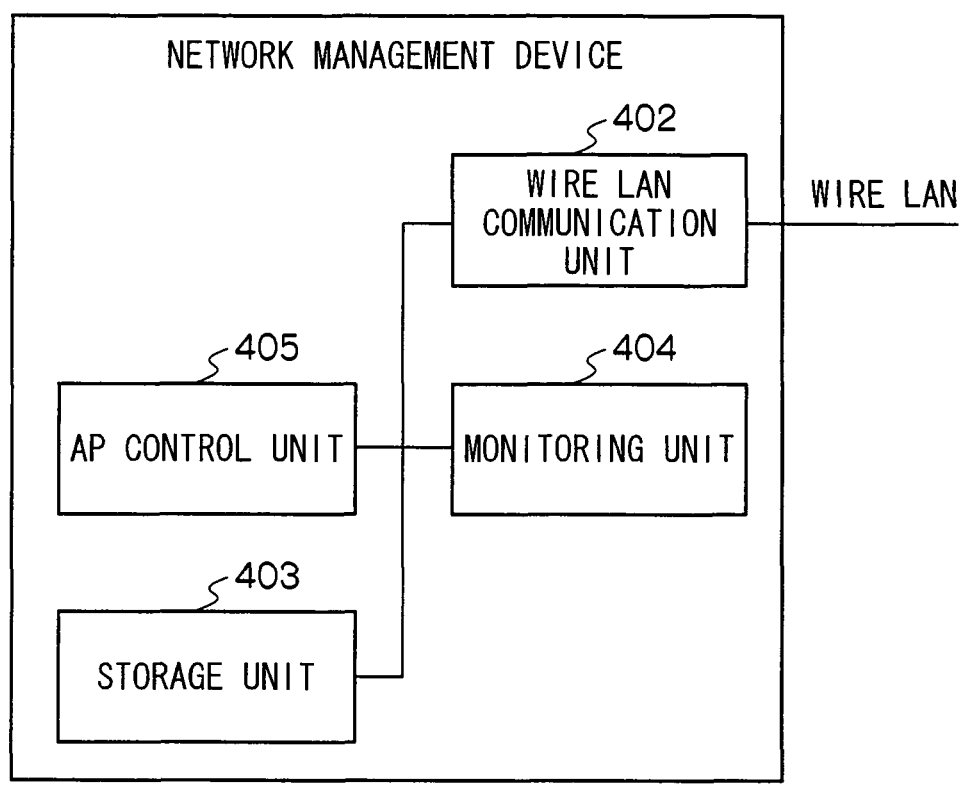
FIG. 18 is a diagram illustrating a configuration of a network management device according to Embodiment 4.

FIG. 18 is a diagram illustrating a configuration of the network management device according to Embodiment 4. As shown in FIG. 18, the network management device 20 includes a wire LAN communication unit 402, a storage unit 403, a monitoring unit 404, and an AP control unit 405.

The wire LAN communication unit 402 is connected to the wire LAN, and is connected to the AP and the server.

The storage unit 403 stores plural profiles for each AP therein. The storage unit 403 stores an AP identifier such as a name or an IP address of the AP and the plural profiles for each of the plural APs together as pairs, to refer to the plural profiles for each AP. Accordingly, it is possible to refer to the plural profiles for each AP using the AP identifier as a key.

The profile data stored in the storage unit 403 is the same as the profile data (FIGS. 3A to 3C) stored in the storage unit 103 of the AP 4 to the AP 6 in Embodiment 1. Specifically, the storage unit 403 stores the AP identifier of the AP 4 and the profile shown in FIG. 3A together as pairs. In addition, the storage unit 403 stores the AP identifier of the AP 5 and the profile shown in FIG. 3B together as pairs, and stores the AP identifier of the AP 6 and the profile shown in FIG. 3C together as pairs.

The monitoring unit 404 monitors the server on the basis of the profiles stored in the storage unit 403. The monitoring unit 404 refers to the profiles of the storage unit 403, and monitors the monitoring target set to "MONITORING TARGET FLAG ON" on the basis of the monitoring target flag of the profiles.

Specifically, the monitoring unit 404 performs the monitoring on the basis of "IP ADDRESS 1 OF MAIN SERVER 1" set to "MONITORING TARGET FLAG ON" with reference to FIG. 3A. Similarly, the monitoring unit 404 performs the monitoring on the basis of "IP ADDRESS 1 OF MAIN SERVER 1" and "IP ADDRESS 2 OF SURVIVAL SERVER 2" set to "MONITORING TARGET FLAG ON" with reference to FIG. 3B. Similarly, the monitoring unit 404 performs the monitoring on the basis of "IP ADDRESS 1 OF MAIN SERVER 1" and "IP ADDRESS 3 OF SURVIVAL SERVER 3" set to "MONITORING TARGET FLAG ON" with reference to FIG. 3C.

"IP ADDRESS 1 OF MAIN SERVER 1", "IP ADDRESS 2 OF SURVIVAL SERVER 2", and "IP ADDRESS 3 OF SURVIVAL SERVER 3" correspond to the identification information of the main server or the survival server in the invention.

The monitoring unit 404 monitors (detects) the communication state between the server and the network management device 20. The monitoring unit 404 performs the monitoring through the LAN for connection to the main server 1, the survival server 2, and the survival server 3. As a means for monitoring the communication state, the ICMP ping, the SIP message, and the like are used in the same manner as Embodiment 1.

When the monitoring unit 404 requests the connection and can obtain the connection response from the server, the monitoring unit 404 recognizes that the connection has succeeded and that the communication between the server and the network management device 20 is normal. In addition, when the monitoring unit 404 requests the connection and cannot obtain the connection response from the server, the monitoring unit 404 recognizes that the connection has failed and that there is a communication failure between the server and the network management device 20. When the connection to the server fails and the monitoring unit 404 recognized that a failure has occurred, the monitoring unit 404 gives the monitoring target flag ON, the SSID of the profile including the server which has a successful connection, and the corresponding scanning method in the profiles stored in the storage unit 403, to the AP control unit 405. In addition, when there is no profile scanning method stored, the scanning method is not set.

The AP control unit 405 controls the AP on the basis of the monitoring of the monitoring unit 404. The AP control unit 405 performs the settings control for the AP in the same manner as the AP control unit 205 according to Embodiment 3. However, the AP control unit 405 is different from the AP control unit 205 in that the initial settings control is not performed.

The AP control unit 405 performs the settings control for each of the AP 4 to the AP 6, as the control based on the monitoring of the monitoring unit 404. When the monitoring unit 404 recognizes that the connection to the server fails and failure occurs in the communication between the server and the network management device 20, the AP control unit 405 sets the SSID given from the monitoring unit 404 and the corresponding scanning method, for the AP. This setting is performed by transmitting a settings signal including the information on the SSID set for the AP and the corresponding scanning method, through the wire LAN communication unit 402. The settings signal includes the AP identifier of the AP that is the setting target to determine the AP of the setting target. When there is no profile scanning method stored, the scanning method is not set.

Next, a configuration of the AP will be described.

The configuration of the AP 4 to AP 6 in Embodiment 4 includes the wire LAN communication unit 301 and the wireless LAN communication unit 302 in the same manner as the AP described in Embodiment 3 (FIG. 12).

The SSID and the corresponding scanning method (only when the scanning method is set) are set in advance in the wireless LAN communication unit 302 according to Embodiment 4. The reason being because the AP control unit 405 does not perform the initial settings control in Embodiment 4 as described above.

In the preset SSID and corresponding scanning method (only when the scanning method is set), the SSID shown at the top in the profiles stored in the storage unit 403 is set. Specifically, the AP 4 (FIG. 3A) is set in advance to the SSID 1, the AP 5 (FIG. 3B) is set in advance to the SSID 1, and the AP 6 (FIG. 3C) is set in advance to the SSID 1.

The SSID and the corresponding scanning method (only when the scanning method is set) are set in the wireless LAN communication unit 302 of the AP 4 to the AP 6 by the settings control from the network management device 20.

This setting will be described in detail. In the settings control of the AP control unit 405 of the network management device 20, a settings signal is transmitted. The settings signal reaches the wire LAN communication unit 301 of the AP. When the AP identifier is included in the settings signal, a control unit (not shown) of the AP determines whether or not the AP including the AP is the settings target on the basis of the AP identifier. Then, when the AP is the settings target, the control unit sets the wireless LAN communication unit 302 on the basis of the settings signal.

Next, an operation will be described when a communication failure has occurred between the main server 1 and the network management device 20. Normally, a calling process and an operation such as establishing the phone communication are the same as those of Embodiment 1.

Figure 19:
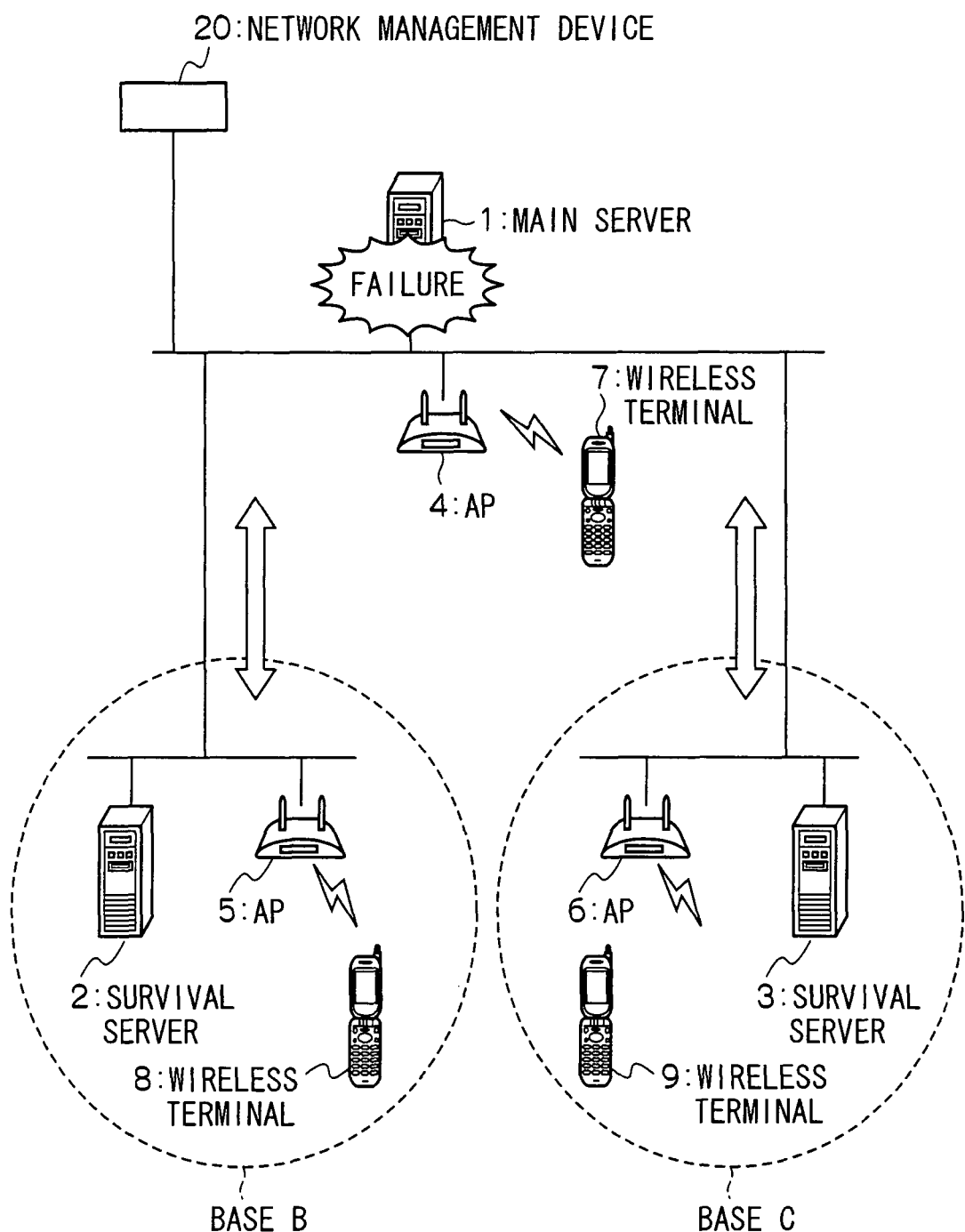
FIG. 19 is a diagram illustrating network connection at the time of a communication failure according to Embodiment 4.
Figure 20:
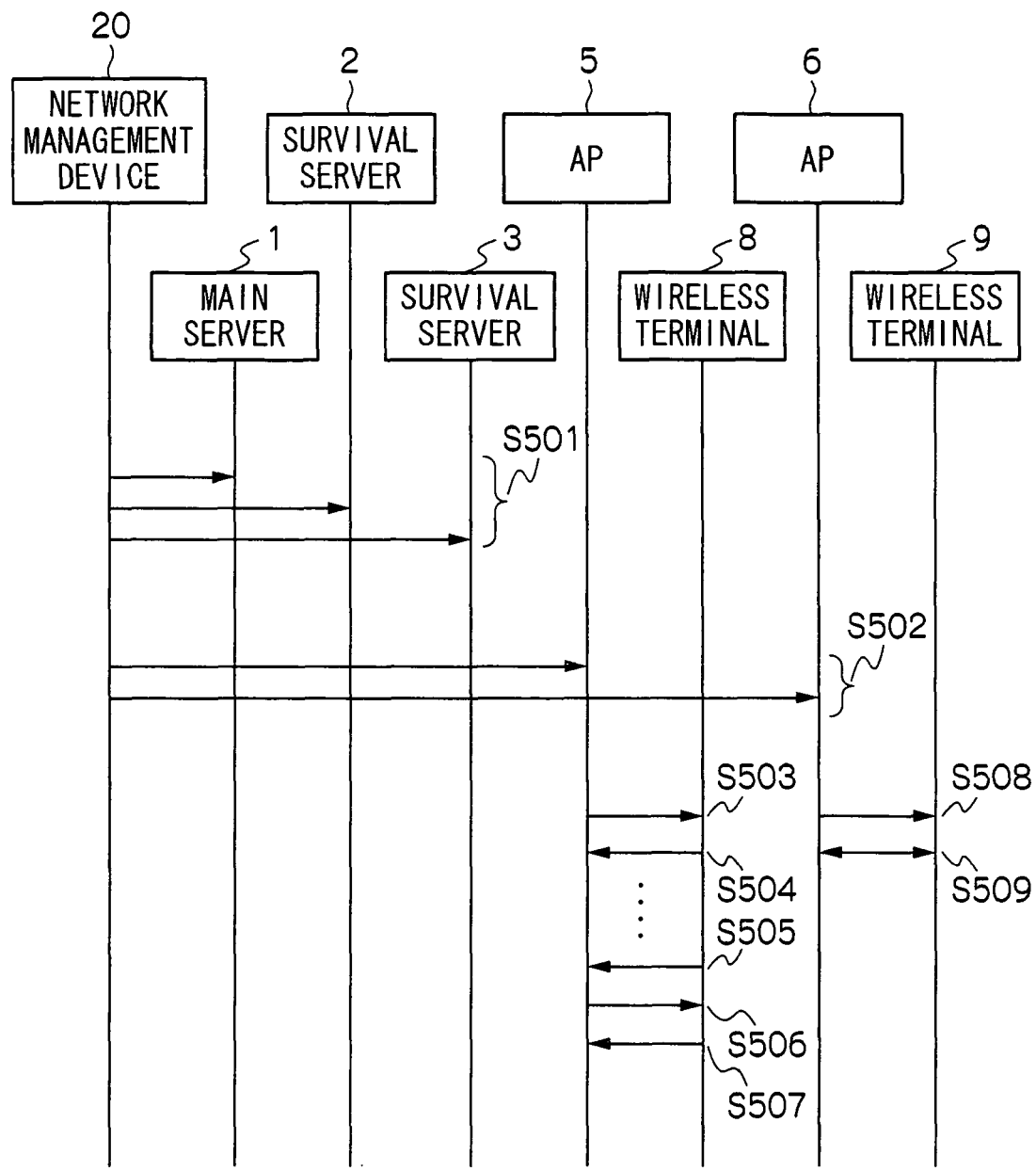
FIG. 20 is a sequence diagram illustrating a server switching operation according to Embodiment 4.

FIG. 19 is a diagram illustrating the network connection according to Embodiment 4 at the time of a communication failure. FIG. 20 is a sequence diagram illustrating a server switching operation according to Embodiment 4. As shown in FIG. 19, an operation will be described when a failure has occurred in communication between the network management device 20 and the main server 1 and communication between the network management device 20 and the survival server 2 and between the network management device 20 and the survival server 3 is normal with reference to FIG. 20.

(S501) The monitoring unit 404 monitors the communication state with "IP ADDRESS 1 OF MAIN SERVER 1", "IP ADDRESS 2 OF SURVIVAL SERVER 2", and "IP ADDRESS 3 OF SURVIVAL SERVER 3" of "MONITORING TARGET FLAG ON" through the wire LAN communication unit 402 on the basis of the profiles stored in the storage unit 403. In the state shown in FIG. 19, the monitoring unit 404 recognizes that a failure has occurred in the communication between the network management device 20 and the main server 1, since the connection to the main server 1 has failed. In addition, the monitoring unit 404 recognizes that the communication between the network management device 20 and the survival server 2 and between the network management device 20 and the survival server 3 is normal, since the connection to the survival server 2 and the survival server 3 has succeeded.

(S502) When the connection to the main server 1 fails and the monitoring unit 404 of the network management device 20 recognizes that a failure has occurred, the monitoring unit 404 gives the AP control unit 405 the monitoring target flag ON, the SSID of the profiles including the server which has a successful connection, the corresponding scanning method (only when the scanning method is set), and the AP identifier, in the profiles of the plural APs stored in the storage unit 403.

Specifically, when it is recognized that a communication failure has occurred between the network management device 20 and the main server 1, and the network management device 20 succeeds in connection to the survival server 2 and the survival server 3, the following process is performed. The monitoring unit 404 refers to the monitoring target flag ON and the profiles including the survival server 2 or the survival server 3 which have a successful connection, in the profiles stored in the storage unit 403, from the top to the bottom. Accordingly, the monitoring unit 404 obtains "SSID 2" and the corresponding scanning method "ACTIVE" in the profiles (FIG. 3B) corresponding to the AP 5. Then, the monitoring unit 404 obtains the AP identifier of the AP 5 stored as a pair with the profiles (FIG. 3B) corresponding to the AP 5. As a result, the monitoring unit 404 gives the AP control unit 405 the AP identifier of the AP 5, "SSID 2", and the corresponding scanning method "ACTIVE" as the settings information for the AP 5.

Similarly, the monitoring unit 404 refers to the monitoring target flag ON and the profiles including the survival server 2 or the survival server 3 which have a successful connection, in the profiles stored in the storage unit 403, from the top to the bottom. Accordingly, the monitoring unit 404 obtains "SSID 3" and the corresponding scanning method "PASSIVE" in the profiles (FIG. 3C) corresponding to the AP 6. Then, the monitoring unit 404 obtains the AP identifier of the AP 6 stored as a pair with the profiles (FIG. 3C) corresponding to the AP 6. As a result, the monitoring unit 404 gives the AP control unit 405 the AP identifier of the AP 6, "SSID 3", and the corresponding scanning method "PASSIVE" as the settings information for the AP 6.

Subsequently, the AP control unit 405 of the network management device 20 performs the settings control on the basis of the given settings information, thereby performing the settings for AP 5 and the AP 6. At this time, the AP control unit 405 transmits the settings signal including the settings information of the AP identifier of the AP 5, "SSID 2", and the corresponding scanning method "ACTIVE" through the wire LAN communication unit 402. In addition, the AP control unit 405 transmits the settings signal including the settings information of the AP identifier of the AP 6, "SSID 3", and the corresponding scanning method "PASSIVE" through the wire LAN communication unit 402.

(S503) The wireless LAN communication unit 302 of the AP 5 sets the "SSID 2" and the corresponding scanning method to "ACTIVE" for the AP 5 on the basis of the settings signal including the AP identifier of the AP 5 of the received settings signal. When the wireless LAN communication unit 302 of the AP 5 completes the settings, the wireless LAN communication unit 302 of the AP 5 transmits the disconnection signal message (Deauthentication) to the wireless LAN and performs the recursion process.

(S504 to S507) The wireless terminal 8 and the AP 5 perform the connection process in the same manner of the operation of S305 to S308 according to Embodiment 3. Accordingly, the calling signal transmitted from the wireless terminal 8 reaches the survival server 2 through the AP 5. Then, the survival server 2 performs the calling process on the basis of the calling signal transmitted from the wireless terminal 8.

(S508) The wireless LAN communication unit 302 of the AP 6 sets the "SSID 3" and the corresponding scanning method to "PASSIVE" for the AP 6 on the basis of the settings signal including the AP identifier of the AP 6 in the received setting signal. When the wireless LAN communication unit 302 of the AP 6 completes the settings, the wireless LAN communication unit 302 of the AP 6 transmits the disconnection signal message (Deauthentication) and the control signal (beacon) including "SSID 3" set for the AP 6 to the wireless LAN and performs the recursion process.

(S509) The wireless terminal 9 and the AP 6 perform the connection process in the same manner of the operation of S405 according to Embodiment 3. Accordingly, the calling signal transmitted from the wireless terminal 9 reaches the survival server 3 through the AP 6. Then, the survival server 3 performs the calling process on the basis of the calling signal transmitted from the wireless terminal 9.

"SSID 1" corresponds to the first network identifier in the invention, and "SSID 2" and "SSID 3" corresponds to the second network identifier in the invention.

In the embodiment as described above, the network management device 20 detects the communication state between the server and the network management device 20, and sets the SSID of the access point on the basis of the communication state. The terminal communicates information with the main server 1, the survival server 2, or the survival server 3 according to the SSID. For this reason, it is possible to obtain the same advantages as Embodiment 1.

The monitoring of the communication state is performed by the network management device 20, and the settings control of the SSID is performed for the AP. For this reason, it is possible to simplify the configuration of the AP. In addition, it is possible to establish a system capable of server switching by adding the network management device 20 to the existing network system according to the SSID.

In Embodiment 4, the case has been described where setting the SSID of the AP is performed on the basis of the communication state, but the invention is not limited thereto and the SSID of the AP may be set on the basis of the load state of the server described in Embodiment 2. In addition, the SSID may be switched on the basis of either or both of the communication failure and the high load state. That is, the monitoring unit 404 of the network management device 20 may select to perform only the failure recognition or only the load recognition, otherwise, the failure recognition and the load recognition, by setting the failure recognition and the load recognition for the monitoring unit 404. In this case, the monitoring unit 404 may perform the load monitoring by the same operation as that of the monitoring unit 104 according to Embodiment 2.

Embodiment 5

In Embodiment 3, the configuration has been described in which the controller is provided for each base and each controller accepts the AP. As described above, the controller may accept the plural APs. In addition, the controller may accept the plural APs over the base. In Embodiment 5, a case where one controller accepts the plural APs will be described.

First, a configuration of the wireless communication system according to Embodiment 5 will be described on the basis of difference from Embodiment 1 and Embodiment 3. In addition, the same reference numerals and signs are given to the same configurations as those of Embodiment 1 and Embodiment 3.

Figure 21:
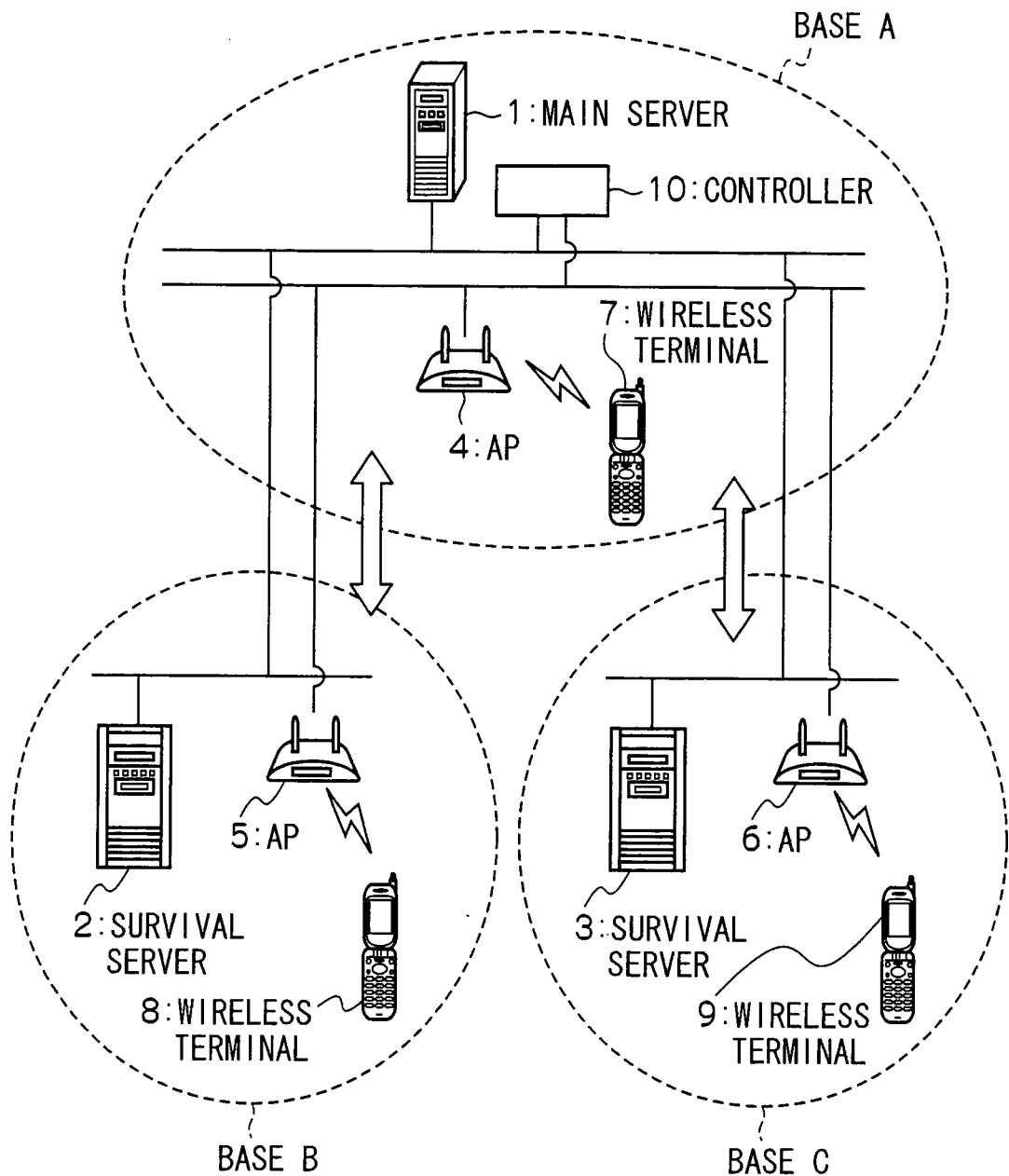
FIG. 21 is a diagram illustrating a configuration of a wireless IP phone system according to Embodiment 5.

FIG. 21 is a diagram illustrating a configuration of the wireless IP phone system according to Embodiment 5. As shown in FIG. 21, the wireless IP phone system according to the embodiment has a configuration in which one controller 10 accepts the plural APs over the base. The configurations of the main server 1, the survival servers 2 and 3, and the wireless terminals 7 to 9 are the same as those of Embodiment 1. In addition, the configurations of the AP 4 to the AP 6 are the same as those of Embodiment 3.

The controller 10 is installed in the base A. The controller 10 accepts (communicates with) the AP 4 in the base A, the AP 5 in the base B, and the AP 6 in the base C. The controller 10 communicates with the APs by an AP-accepting LAN. The controller 10 communicates with the server by the wire LAN.

The configuration of the controller 10 in Embodiment 5 includes the first wire LAN communication unit 201, the second wire LAN communication unit 202, the storage unit 203, the monitoring unit 204, the AP control unit 205, in the same manner as the controller described in Embodiment 3 (FIG. 11).

The storage unit 203 according to Embodiment 5 stores plural profiles for each AP therein. The storage unit 203 stores an AP identifier such as a name or an IP address of the AP and the plural profiles for each of the plural APs together as pairs, to refer to the plural profiles for each AP. Accordingly, it is possible to refer to the plural profiles for each AP using the AP identifier as a key.

The profile data stored in the storage unit 203 of the controller 10 is the same as the profile data (FIGS. 3A to 3C) stored in the storage unit 103 of the AP 4 to the AP 6 in Embodiment 1. Specifically, the storage unit 203 of the controller 10 stores the AP identifier of the AP 4 and the profile shown in FIG. 3A together as pairs. In addition, the storage unit 203 stores the AP identifier of the AP 5 and the profile shown in FIG. 3B, as a couple, and stores the AP identifier of the AP 6 and the profile shown in FIG. 3C.

The monitoring unit 204 of the controller 10 monitors the server on the basis of the profiles stored in the storage unit 203. The monitoring unit 204 refers to the profiles of the storage unit 203, and monitors the monitoring target set to "MONITORING TARGET FLAG ON" on the basis of the monitoring target flag of the profiles.

Specifically, the monitoring unit 204 performs the monitoring on the basis of "IP ADDRESS 1 OF MAIN SERVER 1" set to "MONITORING TARGET FLAG ON" with reference to FIG. 3A. Similarly, the monitoring unit 204 performs the monitoring on the basis of "IP ADDRESS 1 OF MAIN SERVER 1" and "IP ADDRESS 2 OF SURVIVAL SERVER 2" set to "MONITORING TARGET FLAG ON" with reference to FIG. 3B. Similarly, the monitoring unit 204 performs the monitoring on the basis of "IP ADDRESS 1 OF MAIN SERVER 1" and "IP ADDRESS 3 OF SURVIVAL SERVER 3" set to "MONITORING TARGET FLAG ON" with reference to FIG. 3C.

Next, an operation when a communication failure has occurred between the main server 1 and the controller 10 will be described on the basis of difference from Embodiment 3.

The monitoring unit 204 monitors (detects) the communication state between the server and the controller 10. The monitoring unit 204 performs the monitoring through the LAN for connection to the main server 1, the survival server 2, and the survival server 3. That is, the monitoring unit 204 performs the monitoring through the LAN other than the AP-accepting LAN. As a means for monitoring the communication state, the ICMP ping, the SIP message, and the like are used in the same manner as Embodiment 1.

When the monitoring unit 204 requests the connection and can obtain the connection response from the server, the monitoring unit 204 recognizes that the connection succeeds and that the communication between the server and the controller 10 is normal. In addition, when the monitoring unit 204 requests the connection and cannot obtain the connection response from the server, the monitoring unit 204 recognizes that the connection fails and that there is a communication failure between the server and the controller 10. When the connection to the server fails and the monitoring unit 204 recognizes that a failure has occurred, the monitoring unit 204 gives the monitoring target flag to ON, the SSID of the profile including the server succeeding in connection, and the corresponding scanning method in the profiles for each of the plural APs stored in the storage unit 203, to the AP control unit 205. In addition, when there is no profile scanning method stored, the scanning method is not set.

Specifically, when it is recognized that a communication failure has occurred between the controller 10 and the main server 1, and the controller 10 succeeds in connection to the survival server 2 and the survival server 3, the following process is performed. The monitoring unit 204 refers to the monitoring target flag ON and the profiles including the survival server 2 or the survival server 3 which have a successful connection, in the profiles stored in the storage unit 203, from the top to the bottom. Accordingly, the monitoring unit 204 obtains "SSID 2" and the corresponding scanning method "ACTIVE" in the profiles (FIG. 3B) corresponding to the AP 5. Then, the monitoring unit 204 obtains the AP identifier of the AP 5 stored as together as pairs with the profiles (FIG. 3B) corresponding to the AP 5. As a result, the monitoring unit 204 gives the AP control unit 205 the AP identifier of the AP 5, "SSID 2", and the corresponding scanning method "ACTIVE" as the settings information for the AP 5.

Similarly, the monitoring unit 204 refers to the monitoring target flag ON and the profiles including the survival server 2 or the survival server 3 which have a successful connection, in the profiles stored in the storage unit 203, from the top to the bottom. Accordingly, the monitoring unit 204 obtains "SSID 3" and the corresponding scanning method "PASSIVE" in the profiles (FIG. 3C) corresponding to the AP 6. Then, the monitoring unit 204 obtains the AP identifier of the AP 6 stored as together as pairs with the profiles (FIG. 3C) corresponding to the AP 6. As a result, the monitoring unit 204 gives the AP control unit 205 the AP identifier of the AP 6, "SSID 3", and the corresponding scanning method "PASSIVE" as the settings information for the AP 6.

Subsequently, the AP control unit 205 of the controller 10 performs the settings control on the basis of the given settings information, thereby performing the setting for AP 5 and the AP 6. At this time, the AP control unit 205 transmits the settings signal including the settings information of the AP identifier of the AP 5, "SSID 2", and the corresponding scanning method "ACTIVE" through the second wire LAN communication unit 202 by the AP-accepting LAN. In addition, the AP control unit 205 transmits the settings signal including the settings information of the AP identifier of the AP 6, "SSID 3", and the corresponding scanning method "PASSIVE" through the second wire LAN communication unit 202 to the AP-accepting LAN.

Accordingly, the settings signal reaches the AP 5 and the AP 6. The wireless LAN communication unit 302 of the AP 5 sets "SSID 2" and the corresponding scanning method to "ACTIVE" for the AP 5 on the basis of the settings signal including the AP identifier of the AP 5 in the received settings signal. When the wireless LAN communication unit 302 of the AP 5 completes the settings, the wireless LAN communication unit 302 transmits the disconnection signal message (Deauthentication) to the wireless LAN and performs the recursion process. The wireless terminal 8 and the AP 5 perform the connection process in the same manner as the operations of S305 to S308 in Embodiment 3. Accordingly, the calling signal transmitted from the wireless terminal 8 reaches the survival server 2 through the AP 5. The survival server 2 performs the calling process on the basis of the calling signal transmitted from the wireless terminal 8.

The wireless LAN communication unit 302 of the AP 6 sets the "SSID 3" and the corresponding scanning method to "PASSIVE" for the AP 6 on the basis of the settings signal including the AP identifier of the AP 6 in the received settings signal. When the wireless LAN communication unit 302 of the AP 6 completes the settings, the wireless LAN communication unit 302 of the AP 6 transmits the disconnection signal message (Deauthentication) and the control signal (beacon) including "SSID 3" set for the AP 6 to the wireless LAN and performs the recursion process. The wireless terminal 9 and the AP 6 perform the connection process in the same manner of the operation of S405 according to Embodiment 3. Accordingly, the calling signal transmitted from the wireless terminal 9 reaches the survival server 3 through the AP 6. Then, the survival server 3 performs the calling process on the basis of the calling signal transmitted from the wireless terminal 9.

In the embodiment as described above, each of the network identifiers of the plural APs is set on the basis of the communication state of the server. For this reason, even when one controller 10 accepts plural APs, it is possible to set the SSID and the corresponding scanning method for each AP.

Embodiment 6

In Embodiment 3, the controller performs the settings control for the AP, thereby setting the network identifier (SSID) of the AP. In Embodiment 6, a case will be described where access control and traffic control for the AP are set in addition to the settings control of the AP.

The configuration of the wireless communication system according to Embodiment 6 is the same as that of Embodiment 3, and the same reference numerals and signs are given to the same configurations.

The controller according to Embodiment 6 performs at least one out of the access control and the traffic control for the AP according to the communication state between the server and the controller.

As the control performed on the AP by the controller, there is access control (FW (Firewall), PF (Packet Filtering), etc.) for traffic flowing in from the AP, in addition to the above-described settings control for the AP. In addition, there is traffic control (QoS (Quality of Service), etc.) for traffic flowing in from the AP. In addition, there is access control for traffic flowing in from a backbone. In addition, there is traffic control for traffic flowing in from the backbone. The backbone is a LAN of the base A connected to the main server 1 in case of the controller 10.

For example, the profile stored in the storage unit 203 of the controller and the information on the above-described control are stored as together as pairs. Accordingly, it is possible to set the SSID for the AP and to set the control of the controller.

FIG. 22 is a diagram illustrating profile data stored in the storage unit of the controller according to Embodiment 6. Specifically, as shown in FIG. 22, for example, the settings information on "ACCESS CONTROL FOR TRAFFIC FLOWING IN FROM BACKBONE" and "TRAFFIC CONTROL FOR TRAFFIC FLOWING IN FROM BACKBONE"

is stored as a pair in the second-line "PROFILE NAME 2", in addition to the profiles (FIG. 3B) stored in the storage unit 203 of the controller 11.

Accordingly, the controller 11 sets "SSID 1" for the AP 5 on the basis of the profile at the top of FIG. 22 by the same operation as that of Embodiment 3. When a failure is recognized by the monitoring operation, "SSID 2" and the corresponding scanning method "ACTIVE" are set for the AP 5. With this setting, the settings information on "ACCESS CONTROL FOR TRAFFIC FLOWING IN FROM BACKBONE" and "TRAFFIC CONTROL FOR TRAFFIC FLOWING IN FROM BACKBONE" is read, and are set for the controller 11. Then, the controller 11 performs the access control for traffic flowing in from the backbone and the traffic control for traffic flowing in from the backbone on the AP 5.

In the embodiment as described above, it is possible to perform the access control and the traffic control according to the communication state between the controller and the server, in addition to the advantages of Embodiment 3.

Also in Embodiment 6, the profile may be selected on the basis of the load state of the server described in Embodiment 2 to set the SSID and to perform the access control and the traffic control. In addition, the profile may be selected on the basis of either or both of the communication failure and the high load state.

In Embodiment 6, the case has been described where the access control and the traffic control are performed by the controller, but the invention is not limited thereto. For example, in the configuration provided with the network management device 20 described in Embodiment 4, the information on the access control and the traffic control set as a pair with the profile are kept in the storage unit 403 of the network management device 20, and the access control and the traffic control are set for the AP according to the selected profile. With such a configuration, the access control and the traffic control may be performed for the AP.

Embodiment 7

In Embodiments 1 to 6, the case has been described where one kind of control signal (beacon) including one SSID is used as the control signal (beacon) transmitted from the AP when the terminal acquires the AP. In Embodiment 7, a case will be described where plural SSIDs of the AP are set according to the communication state of the server and many kinds of control signals (beacon) are transmitted for each of the set SSIDs.

The configuration of the wireless communication system according to Embodiment 7 is the same as that of Embodiment 1, and the same reference numerals and signs are given to the same configurations.

In Embodiment 7, the AP can transmit the control signals (beacon) of the plural network identifiers. For example, two network identifiers (SSID) are set for one AP, the first SSID and the second SSID are used together, the control signal (beacon) including the first SSID and the control signal (beacon) including the second SSID are transmitted.

FIG. 23 is a diagram illustrating profile data stored in the storage unit of the AP according to Embodiment 7. Specifically, as shown in FIG. 23, for example, "SSID 2" and "SSID 3" are set for "PROFILE NAME 2" in the profiles stored in the storage unit 103 of the AP 5.

The AP 5 monitors the main server 1 and the survival server 2 on the basis of the profiles shown in FIG. 23. In the embodiment, it is assumed that a failure in communication with the main server 1 is recognized, and the connection to the survival server 2 succeeds.

In this case, the AP 5 sets the monitoring target flag ON, the SSID of the profile including the server which has a successful connection, and the corresponding scanning method in the profiles shown in FIG. 23 are set for the AP 5. In addition, when there is no scanning method set, this case corresponds to the above-described normal scanning method.

Specifically, "SSID 2" and the corresponding scanning method are set to "PASSIVE", and "SSID 3" and the corresponding scanning method are set to "PASSIVE". Accordingly, the AP 5 can transmit the control signals (beacon) of "SSID 2" and "SSID 3". That is, the AP 5 transmits the control signal (beacon) including "SSID 2" and the control signal (beacon) including "SSID 3".

In FIG. 23, for example, the same can be applied to the case where the corresponding scanning method of "SSID 3" is "ACTIVE". In this case, "SSID 2" and the corresponding scanning method are set to "PASSIVE", and "SSID 3" and the corresponding scanning method are set to "ACTIVE". Accordingly, the AP 5 transmits the control signal (beacon) including "SSID 2". When the AP 5 receives the connection request signal (Probe Request) for scanning the AP set to "SSID 3" from the terminal, the AP 5 transmits the control signal (beacon) including "SSID 3" set for the AP 5.

In the embodiment as described above, the plural SSIDs of the AP are set, and many kinds of control signals (beacon) are transmitted for each of the plural set SSIDs. For this reason, in the AP capable of transmitting many kinds of control signals (beacon), it is possible to set plural SSIDs according to the communication state.

In Embodiment 7, the configuration according to Embodiment 1 has been described, but the invention is not limited thereto and the same operation may be performed in any configuration of Embodiments 2 to 6.

Also in Embodiment 7, the profile may be selected on the basis of the load state of the server described in Embodiment 2 to set the SSID and the scanning method. In addition, the profile may be selected on the basis of either or both of the communication failure and the high load state.

Embodiment 8

In Embodiment 8, a case will be described for setting or changing security about encryption, authentication, or the like in the wireless communication between the terminal and the AP according to the network identifier (SSID) set for the AP.

The configuration of the wireless communication system according to Embodiment 8 is the same as that of Embodiment 1, and the same reference numerals and signs are given to the same configurations.

FIG. 24 is a diagram illustrating profile data stored in the storage unit according to Embodiment 8. As shown in FIG. 24, in the profiles stored in the storage unit 103 of the AP, settings information of security corresponding to each SSID is included. Then, in the same manner as Embodiment 1, when the SSID is set according to the communication state, security corresponding to the set SSID is set or changed. Herein, as the type of encryption, for example, an appropriate one is selected from WEP (Wired Equivalent Privacy), TKIP (Temporal Key Integrity Protocol) of WPA (Wi-Fi Protected Access), AES (Advanced Encryption Standard) of WPA2 (Wi-Fi Protected Access 2), and the like, and is set in the profiles. In addition, as the type of authentication, an appropriate one is selected from MAC address (Media Access Control Address) filtering, IEEE 802.1X, PSK (Pre-Shared Key), and the like, and is set in the profiles. The setting of the MAC address filtering includes information on admitted MAC address, the setting of IEEE 802.1X includes information on a used RADIUS (Remote Authentication Dial In User Service) server, and the setting of PSK includes information used for creating at least one of authentication and an encryption key.

Specifically, in FIG. 24, encryption corresponding to "SSID 2" of "PROFILE NAME 2" is stored as "AES" and authentication is stored as "PSK". In this case, "SSID 2" is set for the AP, encryption communication is performed by "AES", and authentication is performed by "PSK", with respect to the wireless communication between the AP and the terminal.

In the embodiment as described above, the security in the wireless communication between the terminal and the AP is set or changed according to the network identifier (SSID) set for the AP. For this reason, it is possible to set the security of the communication between the terminal and the AP.

In Embodiment 8, the case of the configuration of Embodiment 1 has been described, but the invention is not limited thereto. That is, even in any configuration of Embodiments 2 to 7, the same operation can be performed.

Also in Embodiment 8, the profile is selected on the basis of the load state of the server described in Embodiment 2 to set or change the security. In addition, the profile may be selected on the basis of either or both of the communication failure and the high load state.

What is claimed is:

1. A wireless communication system comprising:
   a wireless terminal that communicates information;
   a plurality of access points that are configured to performs wireless communication with the wireless terminal;
   a main server that is configured to communicates with each of the plurality of access points through a network and manages communication between the wireless terminal and other wireless terminals; and
   a plurality of survival servers each corresponding to one of the plurality of access points and being configured to communicates with the corresponding access point through the network and substitutes for the main server in managing the communication between the wireless terminal and other wireless terminals,
   wherein each access point is configured to detect a communication state between the main server and the access point and a communication state between the survival server corresponding to the access point and the access point by requesting a direct communication with the main server and the survival server corresponding to the access point, and sets a network identifier of the access point according to the detected communication states, and
   the wireless terminal performs wireless communication with the access point using the set network identifier, and the wireless terminal communicates information with the main server when the set network identifier is a network identifier associated with the main server, and communicates information with the survival server corresponding to the access point when the set network identifier is a network identifier associated with the survival server corresponding to the access point.

2. The wireless communication system according to claim 1, wherein the access point sets the network identifier associated with the main server when the communication between the main server and the access point is normal, and sets the network identifier associated with the survival server corresponding to the access point when a communication failure occurs between the main server and the access point and the communication between the survival server corresponding to the access point and the access point is normal.

3. The wireless communication system according to claim 1, wherein the access point detects a load state of at least one of the main server and the corresponding survival server, and sets the network identifier of the access point according to the load state and the communication state.

4. The wireless communication system according to claim 3, wherein the access point sets the network identifier associated with the main server when the communication between the main server and the access point is normal and the main server is not in a high load state, and sets the network identifier associated with the survival server corresponding to the access point when the main server is in the high load state, the communication between the survival server corresponding to the access point and the access point is normal, and the survival server corresponding to the access point is not in the high load state.

5. The wireless communication system according to claim 1, wherein the access point comprises:
   a storage unit that stores a plurality of network identifiers each being associated with one of the main server or the plurality of survival servers therein;
   a monitoring unit that detects communication failure between the main server and the access point and between the survival server corresponding to the access point and the access point and sets a flag of the network identifier associated with the main server or the survival server according to the detected communication state; and
   a wireless LAN communication unit that performs wireless communication with the wireless terminal using any one selected from the plurality of network identifiers according to whether or not a communication failure occurs.

6. The wireless communication system according to claim 5, wherein the monitoring unit communicates with the main server and the associated survival server, and detects communication failure between the main server and the access point and between the survival server corresponding to the access point and the access point, using a message based on ICMP ping or SIP.

7. The wireless communication system according to claim 5, wherein the wireless terminal, in which the plurality of network identifiers and identification information of the main server or the survival server corresponding to the network identifiers are stored, communicates information with the main server or the survival server corresponding to the network identifier of the access point capable of communicating with the wireless terminal, using the network identifier.

8. The wireless communication system according to claim 1, wherein the access point changes a scanning method, by which the wireless terminal acquires the access point, according to the communication state between the main server and the access point and between the survival server corresponding to the access point and the access point.

9. The wireless communication system according to claim 1, wherein the access point sets a plurality of network identifiers of the access point according to the communication state between the main server and the access point and between the survival server corresponding to the access point and the access point, and transmits a control signal, by which the wireless terminal acquires the access point, for each of the plurality of set network identifiers.

10. The wireless communication system according to claim 1, wherein the access point sets or changes security in the wireless communication between the wireless terminal and the access point according to the network identifier set for the access point.

11. A wireless communication system comprising:
a wireless terminal that performs wireless communication of information;
plurality of access points that are configured to connects to and perform wireless communication with the wireless terminal;
a main server that is configured to communicates with each of the plurality of access points through a network and manages communication between the wireless terminal and other wireless terminals; and
a plurality of survival servers each corresponding to one of the plurality of access points and each being configured to communicates with the corresponding access point through the network and substitutes for the main server in managing the communication between the wireless terminal and other wireless terminals in place of the main server,
wherein each access point is configured to detects a load state of at least one of the main server and the survival server corresponding to the access point, detects a communication state between the main server and the access point and a communication state between the survival server corresponding to the access point and the access point by requesting a direct communication with the main server and the survival server corresponding to the access point, and sets a network identifier of the access point according to at least one of the detected load state or the detected communication states, and
the wireless terminal performs wireless communication with the access point using the network identifier, and the wireless terminal communicates information with the main server when the set network identifier is a network identifier associated with the main server, and communicates information with the survival server corresponding to the access point when the set network identifier is a network identifier associated with the survival server corresponding to the access point.

12. The wireless communication system according to claim 11, wherein the access point sets the network identifier associated with the main server when the main server is not in a high load state, and sets the network identifier associated with the survival server corresponding to the access point when the main server is in the high load state and the survival server corresponding to the access point is not in the high load state.

13. The wireless communication system according to claim 11, wherein the access point comprises:
a storage unit that stores a plurality of network identifiers each being associated with one of the main server or the plurality of survival servers therein;
a monitoring unit that detects a load state of at least one of the main server or the survival server corresponding to the access point and sets a flag of the network identifier associated with the main server or the survival server according to the detected load state; and
a wireless LAN communication unit that performs wireless communication with the wireless terminal using any one selected from the plurality of network identifiers according to the load state.

14. The wireless communication system according to claim 13, wherein the monitoring unit detects at least one of a CPU use ratio, a memory use ratio, or a NW resource use rate of at least one of the main server or the survival server corresponding to the access point using a message type of SNMP, SNMP version 2, or SNMP version 3.

15. The wireless communication system according to claim 13, wherein the wireless terminal, in which the plurality of network identifiers and identification information of the main server or the survival server corresponding to the network identifiers are stored, communicates information with the main server or the survival server corresponding to the network identifier of the access point capable of communicating with the wireless terminal, using the network identifier.

16. The wireless communication system according to claim 11, wherein the access point changes a scanning method, by which the wireless terminal acquires the access point, according to the communication state between the main server and the access point and between the survival server corresponding to the access point and the access point.

17. The wireless communication system according to claim 11, wherein the access point sets a plurality of network identifiers of the access point according to the communication state between the main server and the access point and between the survival server corresponding to the access point and the access point, and transmits a control signal, by which the wireless terminal acquires the access point, for each of the plurality of set network identifiers.

18. The wireless communication system according to claim 11, wherein the access point sets or changes security in the wireless communication between the wireless terminal and the access point according to the network identifier set for the access point.

19. A wireless communication system comprising:
a wireless terminal that communicates information;
plurality of access points that are configured to connects to and perform wireless communication with the wireless terminal;
a plurality of controllers each associated with one of the plurality of access points and being configured to connect to the associated access point;
a main server that communicates with each of the plurality of controllers through a network and manages communication between the wireless terminal and other wireless terminals; and
a plurality of survival servers each corresponding to one of the plurality of access points and to one of the plurality of controllers associated with said one access point and being configured to communicates with said one controller through the network and substitute for the main server in managing the communication between the wireless terminal and other wireless terminals in place of the main server,
wherein each controller is configured to detects a communication state between the main server and the controller and a communication state between the survival server corresponding to the controller and the controller by requesting a direct communication with the main server and the survival server corresponding to the controller, and sets a network identifier of the access point associated with the controller according to the communication states,
the access point performs wireless communication with the wireless terminal using the set network identifier, and
the wireless terminal performs wireless communication with the access point using the set network identifier, and the wireless terminal communicates information with the main server when the set network identifier is a network identifier associated with the main server, and communicates information with the survival server corresponding to the access point when the set network identifier is a network identifier associated with the survival server corresponding to the access point.

20. The wireless communication system according to claim 19, wherein the controller sets the network identifier associated with the main server for the access point associated with the controller when the communication between the main server and the controller is normal, and sets a the network identifier associated with the survival server corresponding to the controller for the access point associated with the controller when failure occurs in the communication between the main server and the controller and the communication between the survival server and the controller is normal.

21. The wireless communication system according to claim 19, wherein the controller detects a load state of at least one of the main server or the survival server corresponding to the controller, and sets the network identifier of the access point associated with the controller according to the load state and the communication state.

22. The wireless communication system according to claim 21, wherein the controller sets a first network identifier associated with the main server for the access point associated with the controller when the communication between the main server and the controller is normal and the main server is not in a high load state, and sets a network identifier associated with the survival server corresponding to the controller for the access point associated with the controller when the main server is in the high load state, the communication between the survival server corresponding to the controller and the controller is normal, and the survival server corresponding to the controller is not in the high load state.

23. The wireless communication system according to claim 19, wherein the controller comprises:
  a storage unit that stores a plurality of network identifiers each being associated with one of the main server or the plurality of survival servers therein;
  a monitoring unit that detects communication failure between the main server and the controller and between the survival server corresponding to the controller and the controller, and selects any one from the plurality of network identifiers according to whether or not a communication failure occurs; and
  an access point control unit that sets the selected network identifier for the access point.

24. The wireless communication system according to claim 23, wherein the monitoring unit connects to the main server and the survival server, and detects a communication failure between the main server and the controller and between the survival server corresponding to the controller and the controller, using a message based on ICMP ping or SIP.

25. The wireless communication system according to claim 23, wherein the wireless terminal stores the plurality of network identifiers and identification information of the main server or the survival server corresponding to the network identifiers, and communicates information with the main server or the survival server corresponding to the network identifier of the access point capable of communicating with the wireless terminal, using the network identifier.

26. The wireless communication system according to claim 19, wherein the controller performs at least one of traffic control or access control to the access point associated with the controller according to the communication state between the main server and the controller and between the survival server corresponding to the controller and the controller.

27. The wireless communication system according to claim 19, wherein the controller changes a scanning method, by which the wireless terminal acquires the access point, according to the communication state between the main server and the controller and between the survival server corresponding to the controller and the controller.

28. The wireless communication system according to claim 19, wherein the controller sets a plurality of network identifiers of the access point according to the communication state between the main server and the controller and between the survival server corresponding to the controller and the controller, and transmits a control signal, by which the wireless terminal acquires the access point, to the access point for each of the plurality of set network identifiers.

29. The wireless communication system according to claim 19, wherein the controller sets or changes security in the wireless communication between the wireless terminal and the access point associated with the controller according to the network identifier set for the access point associated with the controller.

30. A wireless communication system comprising:
  a wireless terminal that communicates information;
  plurality of access points that are configured to connects to and perform wireless communication with the wireless terminal;
  a main server that is configured to communicates with each of the plurality of access points through a network and manages communication between the wireless terminal and other wireless terminals;
  a plurality of survival servers each corresponding to one of the plurality of access points and being configured to communicate with the corresponding access point through the network and substitutes for the main server in managing the communication between the wireless terminal and other wireless terminals in place of the main server; and
  a network management device that is configured to communicates with each access point through the network,
  wherein the network management device detects a communication state between the main server and the network management device and a communication state between the survival server and the network management device by requesting a direct communication with the main server and the survival server, and sets a network identifier of the access point corresponding to the survival server according to the detected communication states,
  the access point performs wireless communication with the wireless terminal using the set network identifier, and
  the wireless terminal performs wireless communication with the access point using the network identifier, and the wireless terminal communicates information with the main server when the set network identifier is a network identifier associated with the main server, and communicates information with the survival server corresponding to the access point when the set network identifier is a network identifier associated with the survival server corresponding to the access point.

31. The wireless communication system according to claim 30, wherein the network management device sets a network identifier associated with the main server for the access point when the communication between the main server and the network management device is normal, and sets a network identifier associated with the survival server corresponding to the access point for the access point when a communication failure occurs between the main server and the network management device and the communication between the survival server corresponding to the access point and the network management device is normal.

32. The wireless communication system according to claim 30, wherein the network management device detects a load state of at least one of the main server or the survival server corresponding to one of the plurality of access points, and sets the network identifier of the access point according to the load state and the communication state.

33. The wireless communication system according to claim 32, wherein the network management device sets a network identifier associated with the main server for the access point when the communication between the main server and the network management device is normal and the main server is not in a high load state, and sets a network identifier associated with the survival server corresponding to the access point for the access point when the main server is in the high load state, the communication between the survival server corresponding to the access point and the network management device is normal, and the survival server is not in the high load state.

34. The wireless communication system according to claim 30, wherein the network management device comprises:
   a storage unit that stores a plurality of network identifiers each being associated with one of the main server or the plurality of survival servers therein;
   a monitoring unit that detects communication failure between the main server and the network management device and between the survival server corresponding to any one of the plurality of access points and the network management device, and selects and sets a flag of any one from the plurality of network identifiers according to whether or not a communication failure occurs; and
   an access point control unit that sets the selected network identifier for said one of the plurality of access points.

35. The wireless communication system according to claim 34, wherein the monitoring unit connects to the main server and the survival server, and detects communication failure between the main server and the network management device and between the survival server and the network management device, using a message based on ICMP ping or SIP.

36. The wireless communication system according to claim 34, wherein the wireless terminal stores the plurality of network identifiers and identification information of the main server or the survival server corresponding to the network identifiers, and communicates information with the main server or the survival server corresponding to the network identifier of the access point capable of communicating with the wireless terminal, using the network identifier.

37. The wireless communication system according to claim 30, wherein the network management device performs at least one of traffic control or access control to the access point according to the communication state between the main server and the network management device and between the survival server corresponding to the access point and the network management device.

38. The wireless communication system according to claim 30, wherein the network management device changes a scanning method, by which the wireless terminal acquires the access point, according to the communication state between the main server and the network management device and between the survival server corresponding to the access point and the network management device.

39. The wireless communication system according to claim 30, wherein the network management device sets a plurality of network identifiers of the access point according to the communication state between the main server and the network management device and between the survival server corresponding to the access point and the network management device, and transmits a control signal, by which the wireless terminal acquires the access point, to the access point for each of the plurality of set network identifiers.

40. The wireless communication system according to claim 30, wherein the network management device sets or changes security in the wireless communication between the wireless terminal and the access point according to the network identifier set for the access point.

41. An access point in a wireless communication system comprising a plurality of access points including said access point comprising:
   a wireless communication unit that connects to and performs wireless communication with a wireless terminal;
   a wire communication unit that communicates through a network with a first device being configured to perform a management process associated with communication between the wireless terminal and other wireless terminals via any one of the plurality of access points in the wireless communication system and one of a plurality of second devices, each of the second devices corresponding to one of the plurality of access points in the wireless communication system and configured to substitute for the first device in performing the management process associated with the communication between the wireless terminal and other wireless terminals;
   a memory storing a plurality of network identifiers associated with the first device and the plurality of second devices;
   a monitoring unit that detects a communication state between the first device and the access point and a communication state between the second device corresponding to the access point and the access point by requesting a direct communication with the first device and the second device corresponding to the access point, and sets, in the memory, a network identifier of the access point according to the detected communication states, wherein
   the wireless communication unit performs wireless communication with the wireless terminal using the network identifier, and allows the wireless terminal to communicate, by the wire communication unit, information with the first device when the set network identifier is a network identifier associated with the first device, and communicates information with the second device corresponding to the access point when the set network identifier is a network identifier associated with the second device corresponding to the access point.

42. A controller in a wireless communication system comprising a plurality of access points each being configured to connect to and perform wireless communication with a wireless terminal, one of the access points corresponding to the controller, the controller comprising:
   a first wire communication unit that connects to the access point corresponding to the controller;
   a second wire communication unit that connects through a network to a first device being configured to perform a management process associated with communication between the wireless terminal and other wireless terminals via any one of the plurality of access points in the wireless communication system and one of a plurality of second devices, each of the second devices corresponding to one of the plurality of access points and configured to substitute for the first device in performing the management process associated with the communication between the wireless terminal and other wireless terminals;

a memory storing a plurality of network identifiers associated with the first device and the plurality of second devices;

a monitoring unit that detects a communication state between the first device and the controller and a communication state between the second device and the controller by requesting a direct communication with the first device and the second device, and sets, in the memory, a network identifier of the access point corresponding to the controller according to the communication states, wherein the first wire communication unit allows the access point corresponding to the controller to have wireless communication with the wireless terminal using the set network identifier, and allows the wireless terminal to communicate, by the second wire communication unit, information with the first device when the set network identifier is a network identifier associated with the first device, and communicates information with the second device corresponding to the access point corresponding to the controller when the set network identifier is a network identifier associated with the second device corresponding to the access point corresponding to the controller.

43. A network management device comprising:

a wire communication unit that is connected through a network to an plurality of access points that are configured to connects to and perform wireless communication with a wireless terminal, and are connected through the network to a first device being configured to perform a management process associated with communication between the wireless terminal and other wireless terminals and a plurality of second devices, each of the second devices corresponding to one of the plurality of access points in the wireless communication system and configured to substitute for the first device in performing the management process associated with the communication between the wireless terminal and other wireless terminals;

a memory storing a plurality of network identifiers associated with the first device and the plurality of second devices;

a monitoring unit that detects a communication state between the first device and the network management device and a communication state between the second device and the network management device by requesting a direct communication with the first device and second device, and sets, in the memory, a network identifier of at least one of the plurality of access points according to the detected communication states, wherein the wire communication unit allows the at least one access point to have wireless communication with the wireless terminal using the set network identifier of the at least one access point, and allows the wireless terminal to communicate information with the first device when the set network identifier of the at least one access point is a network identifier associated with the first device, and communicates information with the second device corresponding to the at least one access point when the set network identifier of the at least one access point is a network identifier associated with the second device corresponding to the at least one access point.

44. A method of setting a network identifier of any one of a plurality of access points relaying communication and interposed between a first network and a plurality of second networks corresponding to each one of the plurality of access points, the method comprising:

detecting a communication state between a first device disposed in the first network and the access point, and performing a process associated with communication between a wireless terminal and other wireless terminals in the first network and the access point;

detecting a communication state between any one of a plurality of second devices disposed in one of the plurality of second networks and the access point corresponding to said one of the plurality of second networks, and substituting for the first device in performing the process associated with the communication between the wireless terminal and other wireless terminals and the corresponding access point;

wherein the detecting the communication state between the first device and the corresponding access point and the detecting the communication state between the second device and the corresponding access point includes requesting a direct communication with the first device and the second device;

extracting a network identifier of the corresponding access point allowing the wireless terminal to communicate information with the first device according to the detected communication state when the extracted network identifier is a network identifier associated with the first device, and to communicate information with the second device according to the detected communication state when the extracted network identifier is a network identifier associated with the second device; and setting the extracted network identifier for the corresponding access point.

* * * * *